United States Patent
Preliasco et al.

(10) Patent No.: US 12,138,940 B2
(45) Date of Patent: Nov. 12, 2024

(54) METHOD AND DEVICE FOR PERFORMING LOAD CONTROL OF A BATTERY IN A PRINTER

(71) Applicant: ZEBRA TECHNOLOGIES CORPORATION, Lincolnshire, IL (US)

(72) Inventors: Richard J. Preliasco, North Kingstown, RI (US); Roy P. Lyman, Coventry, RI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 220 days.

(21) Appl. No.: 17/064,985

(22) Filed: Oct. 7, 2020

(65) Prior Publication Data

US 2021/0170768 A1 Jun. 10, 2021

Related U.S. Application Data

(63) Continuation of application No. 16/039,977, filed on Jul. 19, 2018, now Pat. No. 10,807,395, which is a
(Continued)

(51) Int. Cl.
*B41J 29/13* (2006.01)
*B41J 2/325* (2006.01)
*B41J 3/36* (2006.01)
*B41J 15/04* (2006.01)
*B41J 17/32* (2006.01)
(Continued)

(52) U.S. Cl.
CPC ............... *B41J 29/13* (2013.01); *B41J 2/325* (2013.01); *B41J 3/36* (2013.01); *B41J 15/04* (2013.01); *B41J 15/042* (2013.01); *B41J 17/32* (2013.01); *B65H 16/06* (2013.01); *H02J 7/0048* (2020.01)

(58) Field of Classification Search
CPC ...... H02J 7/0021; H02J 7/0029; H02J 7/0026; H02J 7/027; H02J 7/1461; H02J 7/166; H02J 7/00302; H02J 7/00304; H02J 7/00306; H02J 7/00308; H02J 7/00309; B41J 29/00; B41J 29/38; B41J 2020/3932;
(Continued)

(56) References Cited

U.S. PATENT DOCUMENTS

| | | | | |
|---|---|---|---|---|
| 5,825,985 A | * | 10/1998 | Asai | ..................... G06K 15/028 346/76.1 |
| 6,571,343 B1 | * | 5/2003 | Johnson | ..................... G06F 1/28 713/340 |

(Continued)

FOREIGN PATENT DOCUMENTS

KR 20030069826 A * 11/2006 ................ H02J 7/02

*Primary Examiner* — Daniel J Colilla

(57) ABSTRACT

An example of the disclosed printer including a load controller in communication with a processor and a smart battery. The processor communicates with the smart battery via a message requesting a state of charge value for the battery and receives a response message from the battery that includes a representation of the state of charge value. Upon receipt of the state of charge value, the processor determines a relationship between the state of charge value and a state of charge threshold, and transmits a signal to the load controller to change an operating state of the battery when the state of charge value is beyond the state of charge threshold.

13 Claims, 28 Drawing Sheets

Related U.S. Application Data continuation of application No. 15/347,564, filed on Nov. 9, 2016, now Pat. No. 10,052,895, which is a continuation of application No. 14/548,742, filed on Nov. 20, 2014, now Pat. No. 9,550,371, which is a continuation of application No. 13/706,690, filed on Dec. 6, 2012, now abandoned, which is a continuation of application No. 12/488,138, filed on Jun. 19, 2009, now Pat. No. 8,342,763.

(60) Provisional application No. 61/073,815, filed on Jun. 19, 2008.

(51) Int. Cl.
*B65H 16/06* (2006.01)
*H02J 7/00* (2006.01)

(58) Field of Classification Search
CPC ..... H01M 10/4257; H01M 2010/4271; H01M 2010/4278
See application file for complete search history.

(56) References Cited

U.S. PATENT DOCUMENTS

| | | | | |
|---|---|---|---|---|
| 7,446,505 | B2* | 11/2008 | Paul | G01R 31/3842 320/132 |
| 2003/0169309 | A1* | 9/2003 | Yokoyama | B41J 29/393 347/14 |
| 2004/0017181 | A1* | 1/2004 | Sakai | H02J 9/002 320/132 |
| 2004/0192407 | A1* | 9/2004 | Formenti | H02J 7/0013 455/575.1 |
| 2005/0052159 | A1* | 3/2005 | Moore | H02J 7/00308 320/134 |
| 2006/0012338 | A1* | 1/2006 | Etzold | H02J 7/0071 320/125 |
| 2006/0200282 | A1* | 9/2006 | Lee | G05D 1/0234 701/23 |
| 2006/0238166 | A1* | 10/2006 | Wanibuchi | H02J 7/0069 320/128 |
| 2007/0123303 | A1* | 5/2007 | Book | H02J 7/00047 455/557 |
| 2008/0211460 | A1* | 9/2008 | Tarng | H02J 7/007182 320/161 |

* cited by examiner

METHOD AND DEVICE FOR PERFORMING LOAD CONTROL OF A BATTERY IN A PRINTER

CROSS-REFERENCE TO RELATED APPLICATIONS

This patent arises from a continuation of U.S. patent application Ser. No. 16/039,977, filed Jul. 19, 2018, which is a continuation of U.S. patent application Ser. No. 15/347,564, filed Nov. 9, 2016, now U.S. Pat. No. 10,052,895, which is a continuation of U.S. patent application Ser. No. 14/548,742, filed Nov. 20, 2014, now U.S. Pat. No. 9,550,371, which is a continuation of U.S. patent application Ser. No. 13/706,690, filed on Dec. 6, 2012, which is a continuation of U.S. patent application Ser. No. 12/488,138, filed on Jun. 19, 2009, now U.S. Pat. No. 8,342,763, which claims the benefit of U.S. Provisional patent Application Ser. No. 61/073,815, filed on Jun. 19, 2008. U.S. patent application Ser. Nos. 15/347,564, 14/548,742, 13/706,690, and 12/488,138 and U.S. Provisional patent Application Ser. No. 61/073,815 are incorporated herein by reference in their entireties.

BACKGROUND

In some applications, it is beneficial to provide a portable printer. For example, portable printers may be beneficial for retail stores. These stores often provide all incoming goods with labels for inventory purposes. It is often easier to relocate a printer than the merchandise. In addition to portability, the stores often desire that the printer be able to produce quality prints and be acquired at an affordable price. Meeting all of these requirements presents several obstacles that printer manufacturers may have to overcome in order to produce a marketable product. Stores may also be interested in labeling shelves or inventory locations with prices or customer information, or possibly more permanent information, such as location. Some of those shelves and inventory locations may be outside, inside a cooler, or near a window or special lighting source. These conditions create additional requirements for the printer and the printed output that manufacturers must overcome.

Beyond stores, other labeling and tracking applications may also require a portable printer. Labeling large items, such as oil field equipment, furniture, or utility fixtures is often best done without moving the item to be labeled. Military supplies, and their containers, are often labeled at remote locations or while in transit. Materials that are hazardous, explosive, or fragile are often labeled without being moved. Items delivered by truck, rail, air, sea container, and even bicycle may need to be labeled in the field. These applications require high quality, durable labels, tags, wristbands, or receipts from a portable printer. Depending on the application, the diverse user of the printer may be a young retail associate, a U.S. Marine, or an oil field worker. The printer could be used in a refrigerated warehouse, an air conditioned department store, an urban delivery route, or a desert war zone. This variety of uses, users, and locations also create additional requirements for the printer and the printed output.

Applicant has identified a number of deficiencies and problems associated with the manufacture, operation, and use of portable printers. Through applied effort, ingenuity, and innovation, Applicant has solved many of these identified problems by developing a solution that is embodied by the present invention, which is described in detail below.

BRIEF SUMMARY OF THE INVENTION

Systems and methods are therefore provided for printing indicia onto media and encoding one or more RFID tags associated with the media. In an exemplary embodiment, the printer comprises a housing defining a ribbon receiving area configured to receive a ribbon cartridge. The printer further comprises a ribbon cover configured to move between a closed ribbon position and an opened ribbon position, and a ribbon cartridge retaining feature configured to engage at least part of the ribbon cartridge. The ribbon cartridge retaining feature is configured to move the ribbon cartridge to an installed position when the ribbon cover is moved to the closed ribbon position, and to move the ribbon cartridge to an accessible position when the ribbon cover is moved to the opened ribbon position.

In some embodiments, the ribbon cartridge retaining feature comprises a lifting portion configured to support at least a part of the ribbon cartridge, and a securing portion configured to maintain the ribbon cartridge in the installed position when the ribbon cartridge retaining feature is in the operational position. The lifting portion and the securing portion may generally define a U-shape. In addition, the lifting portion may be configured to at least partially move the ribbon cartridge between the installed position and the accessible position as the ribbon cartridge retaining feature is moved between the operational position and the retrieval position. The securing portion may comprise contact areas configured to engage the ribbon cartridge to secure the ribbon cartridge in the installed position when the ribbon cartridge retaining feature is in the operational position, and the contact areas may comprise ridges.

The housing of the printer may define a media receiving area configured to receive a supply of media, and the printer may further comprise a media cover configured to move between a closed media position and an opened media position. The media cover may comprise an electromagnetic shield, and the media cover may be configured such that when the media cover is in the closed media position, the electromagnetic shield is positioned between the media receiving area and the ribbon receiving area. In some cases, the media cover may be blocked from moving to the closed media position when the ribbon cartridge retaining feature is in the retrieval position.

In some embodiments, the printer may further comprise a linkage connecting the ribbon cover to the ribbon cartridge retaining feature. Movement of the ribbon cover from the closed ribbon position to the opened ribbon position may be transmitted through the linkage to move the ribbon cartridge retaining feature from the operational position to the retrieval position.

The printer may also include a ribbon cover button configured to facilitate movement of the ribbon cover from the closed ribbon position to the opened ribbon position, and a media cover button configured to facilitate movement of the media cover from the closed media position to the opened media position. The media cover button may be located generally proximate the ribbon cover button. In some cases, the ribbon cover button may only be accessible by a user when the media cover is in the opened media position.

The linkage may comprise a sliding component defining a first end and a second end, and a rotating component defining a first leg and a second leg. The first end of the sliding component may be hingedly connected to the ribbon cover, and the second end of the sliding component may be slidingly engaged with the first leg of the rotating component. The second leg of the rotating component may further comprise a slot configured to receive an extension defined by the ribbon cartridge retaining feature, such that movement of the ribbon cover between the closed ribbon position and the opened ribbon position slides the second end of the sliding component along the first leg of the rotating component and rotates the rotating component with respect to the housing, thereby moving the ribbon cartridge retaining feature between the operational position and the retrieval position, respectively, via the extension. The ribbon cover and the ribbon cartridge retaining feature are configured to move substantially simultaneously.

In other embodiments, a printing mechanism is provided comprising a printhead, a platen configured to oppose the printhead during printing operations, and a printhead support configured to receive the printhead, wherein the printhead support defines a pocket configured to receive an RFID coupler. The printing mechanism may further comprise a ribbon cartridge comprising a supply spool and a take-up spool, where the ribbon extends between the supply spool and the take-up spool, and where the printhead support is positioned between the supply spool and the take-up spool. The printhead support may also define a bracket portion configured to receive the ribbon guide.

In some cases, the platen may also be positioned on a media cover that is configured to move between an opened media position and a closed media position such that the platen is configured to operationally engage the printhead when the media cover is in the closed media position.

In still other embodiments, the printer comprises a housing defining a ribbon receiving area, and a printhead support extending from the housing for receiving a printhead. The ribbon receiving area may be configured to receive a ribbon cartridge comprising a cartridge frame structured to support a supply spool, a take-up spool, and a ribbon extending between the supply spool and the take-up spool, and the printhead support may define first and second channels disposed on opposite sides of the printhead, where each of the first and second channels is structured to receive at least part of the cartridge frame. In some cases, the printhead may be positioned between the supply spool and the take-up spool.

The ribbon cartridge in some cases is movable between an installed position during printing operations and an accessible position to facilitate replacement. The ribbon cartridge may define a first orientation relative to the printhead support when disposed in the installed position and a second orientation relative to the printhead support when disposed in the accessible position. Furthermore, the cartridge frame of the ribbon cartridge may be substantially aligned with a top surface of the printhead support when the ribbon cartridge is disposed in the installed position, and the cartridge frame of the ribbon cartridge may extend at least partially beyond the top surface of the printhead support when the ribbon cartridge is disposed in the accessible position.

In addition, the cartridge frame of the ribbon cartridge may define gripping portions, wherein the gripping portions are disposed below a top surface of the printhead support when the ribbon cartridge is disposed in the installed position, and wherein the gripping portions are disposed above the top surface of the printhead support when the ribbon cartridge is disposed in the accessible position.

The printer may further comprise a ribbon cartridge retaining feature movable between an operational position and a retrieval position. The ribbon cartridge retaining feature may secure the ribbon cartridge in the installed position when disposed in the operational position, and the ribbon cartridge retaining feature may support the ribbon cartridge in the accessible position when disposed in the retrieval position. The ribbon cartridge retaining feature may define a securing portion configured to engage and secure the ribbon cartridge in the installed position when the ribbon cartridge retaining feature is disposed in the operational position, and the ribbon cartridge retaining feature may define a lifting portion configured to lift and support the ribbon cartridge in the accessible position when the ribbon cartridge retaining feature is disposed in the retrieval position.

In still other embodiments, a printer is provided that is adapted to print to a media having opposite ends, where the media is adapted to transition from a laterally strong condition to a laterally weak condition. The printer may comprise a housing defining a media receiving area configured to receive the media, two media support arms extending from the housing proximate the media receiving area for engaging opposite ends of the media, and a media cover configured to move between a closed position and an open position, the media cover comprising a second locking element. At least one of the media support arms may be biased to slidably translate along the housing to provide a holding force to opposite sides of the media, and the at least one of the media support arm may define a first locking element. The first locking element of the at least one of the media support arms may be configured to engage the second locking element of the media cover when the media cover is in the closed position.

The first locking element may be movable within the media support arm and may be biased towards engagement with the second locking element. In addition, the first locking element may include a spring configured to move the first locking element into engagement with the second locking element when the media cover is closed, thereby stabilizing the at least one of the media support arms during printing operations. In some cases, the second locking element may be configured to slope towards a center of the second locking element.

In still other embodiments, a printer is provided that comprises a ribbon cover configured to move between an opened ribbon position for providing access to the ribbon supply and a closed ribbon position, and a media cover configured to move between an opened media position for providing access to a media supply and a closed media position. One of the ribbon cover and the media cover may comprise a slidable opening mechanism.

In some cases, the printer defines a top surface, a front surface, and a bottom surface. The ribbon cover and the media cover may each form at least part of the front surface, and the slidable opening mechanism may be biased upwardly along a slide direction generally away from the bottom surface. The slidable opening mechanism may be configured to retain the respective cover in the respective opened position.

Furthermore, the other of the ribbon cover and the media cover may comprise a clamshell opening mechanism. The printer further comprises a first button for triggering the clamshell opening mechanism and/or a second button for triggering the slidable opening mechanism, wherein the second button is positioned generally adjacent to the first button. The printer may further comprise a seam defined between the ribbon cover and the media cover, wherein the first button and the second button are generally positioned proximate the seam.

In addition, the printer may define a top surface, a front surface, and a bottom surface, and the ribbon cover and the media cover may each form at least part of the front surface. The slidable opening mechanism may be biased upwardly along a slide direction generally away from the bottom surface, and the clamshell opening mechanism may be structured to pivot downwardly generally away from the top surface. Furthermore, the ribbon cover may comprise the slidable opening mechanism, and the media cover may comprise the clamshell opening mechanism.

In still other embodiments, a ribbon cartridge is provided that includes a supply spool, a take-up spool, and a cartridge frame. The cartridge frame comprises a first portion structured to support the supply spool and a second portion structured to support the take-up spool. A retrieval assist angle may be defined between the first portion and the second portion, and a gripping portion may be defined proximate the retrieval assist angle. The gripping portion may include ridges defined in the cartridge frame that facilitate grasping of the ribbon cartridge by a user. In addition, the ribbon cartridge may be adapted to be received in a printer, such that the gripping portion is exposed for grasping by a user when the ribbon cartridge is disposed in an accessible position, and not exposed for grasping by the user when the ribbon cartridge is disposed in an installed position. In some cases, the take-up spool may define an RFID tag configured to hold information regarding the ribbon cartridge.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
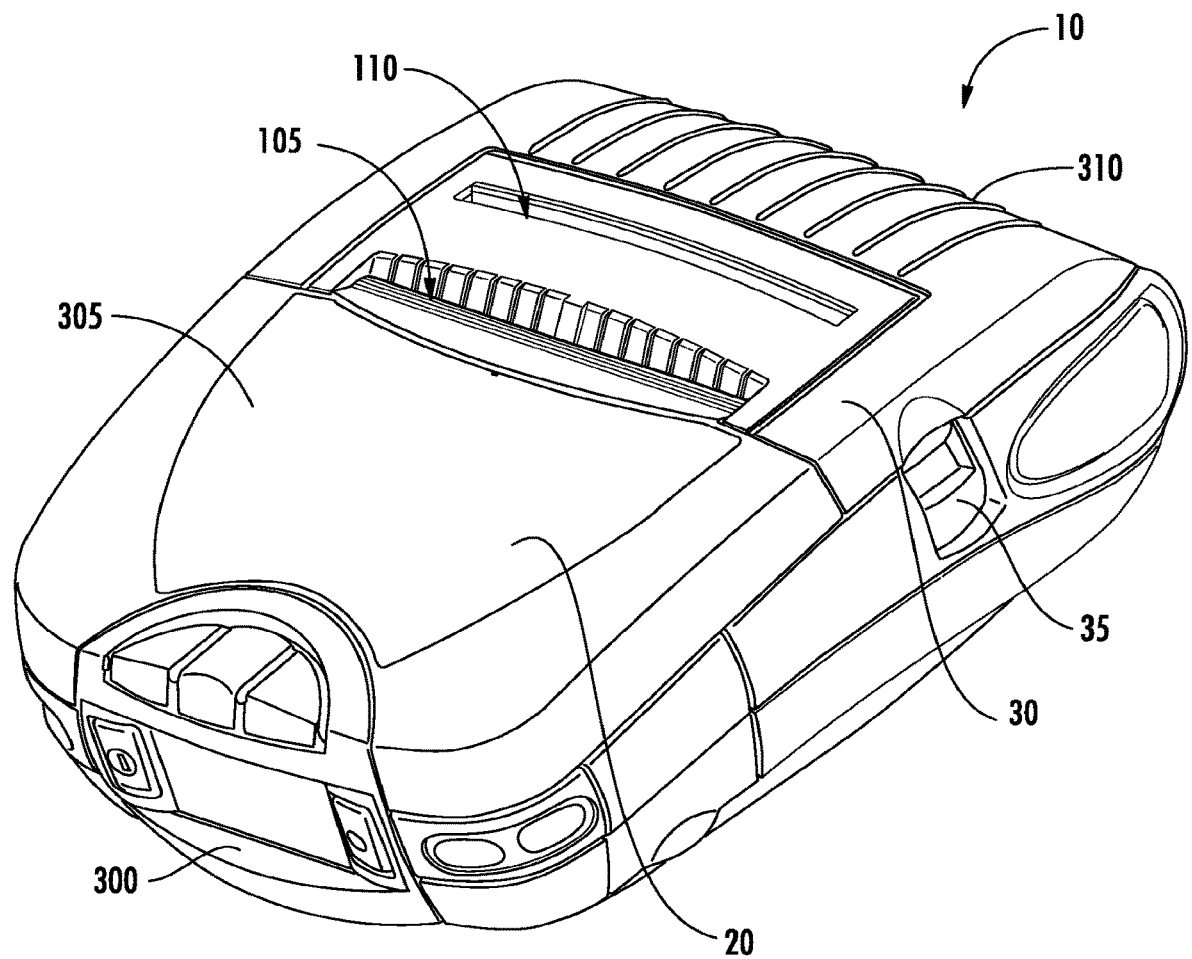
FIG. 1 illustrates a printer according to an exemplary embodiment.

Embodiments of the present inventions now will be described more fully hereinafter with reference to the accompanying drawings, in which some, but not all embodiments of the inventions are shown. Indeed, embodiments of these inventions may be embodied in many different forms and should not be construed as limited to the embodiments set forth herein; rather, these embodiments are provided so that this disclosure will satisfy applicable legal requirements. Like reference numerals refer to like elements throughout. Further, the term "exemplary" as used herein is defined to indicate an example, and should not be construed to indicate a qualitative assessment.

The devices, systems, and methods of the present invention may be used by manufacturers and distributors for printing needs, such as printing shipping labels or product label tags. The devices, systems, and methods described provide an ability to quickly and easily manage supplies and products, store information on product labels, and aid in product shipping. The devices, systems, and methods may be stand alone applications, or they may communicate with other devices to help facilitate management of products or supplies.

One such application is that of a printer 10, as seen in FIG. 1. For the purposes of explanation, the printer 10 will be described in terms of a portable thermal transfer printer, although it is understood that the devices, systems, and methods of embodiments of the present invention may be used for any printer or device with similar components, including direct thermal printers. The printer 10 is typically used for encoding and reading RFID tags, as well as printing labels.

Figure 2:
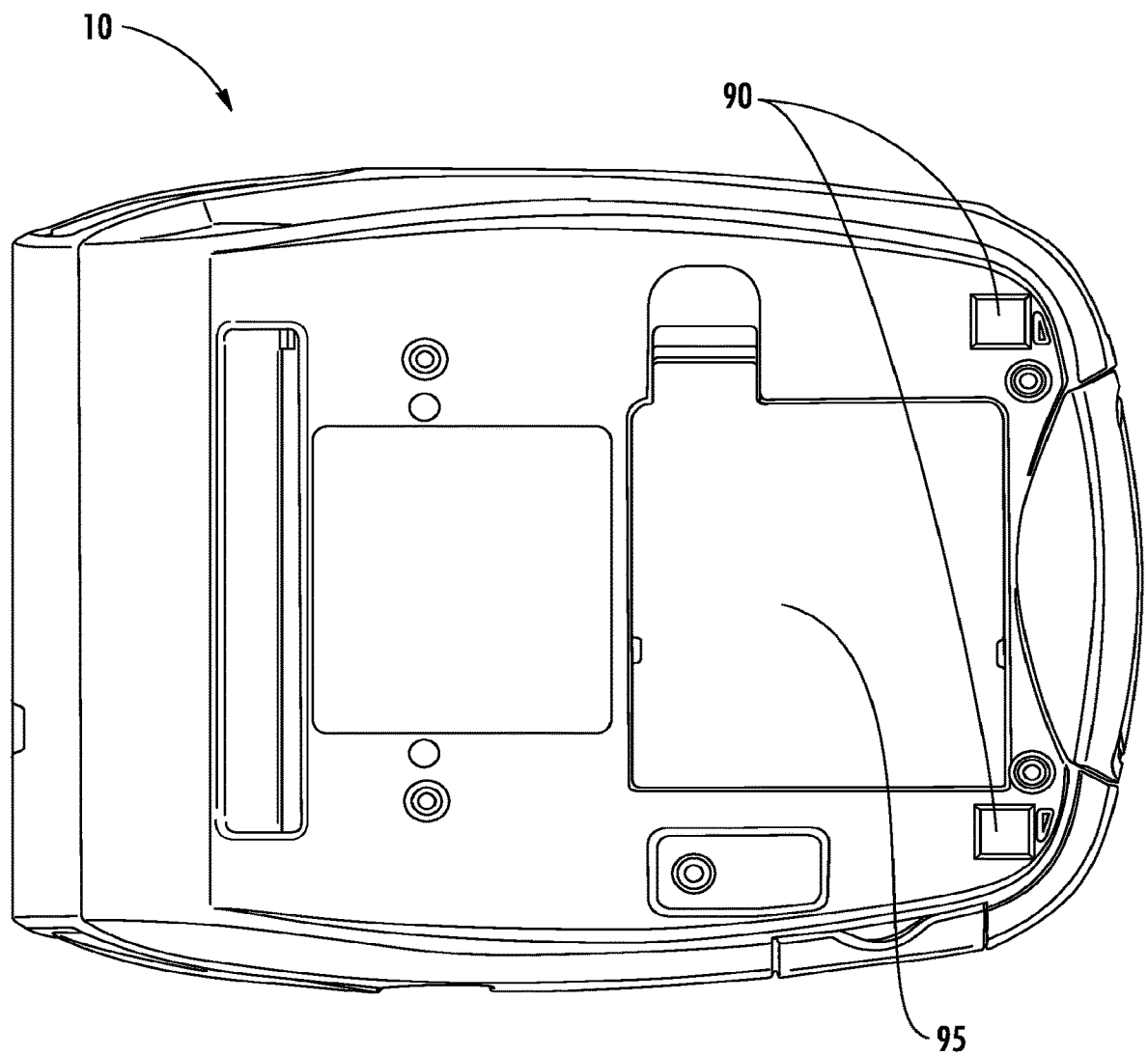
FIG. 2 is a bottom view of the printer of FIG. 1.

An embodiment of the printer 10 may be useful in a fast-paced moving environment due to its portability. The relatively small, lightweight design of the printer 10 allows the printer to be easily picked up and carried. The printer 10 may define one or more attachment openings 90, as seen in FIG. 2. The attachment openings 90 are configured to engage a latching mechanism for connection to and/or the support of a cradle or other device or support. To further allow for portability, the printer 10 may include one or more batteries, e.g., a smart battery 95, as a power source. In this way, the printer 10 may be quickly moved to convenient locations without regard for the location of power outlets. In some cases, the battery may be external to the printer, as in the case when a separate battery is provided on a cart, or when the battery in a vehicle is used to provide power for the printer.

Figure 3:
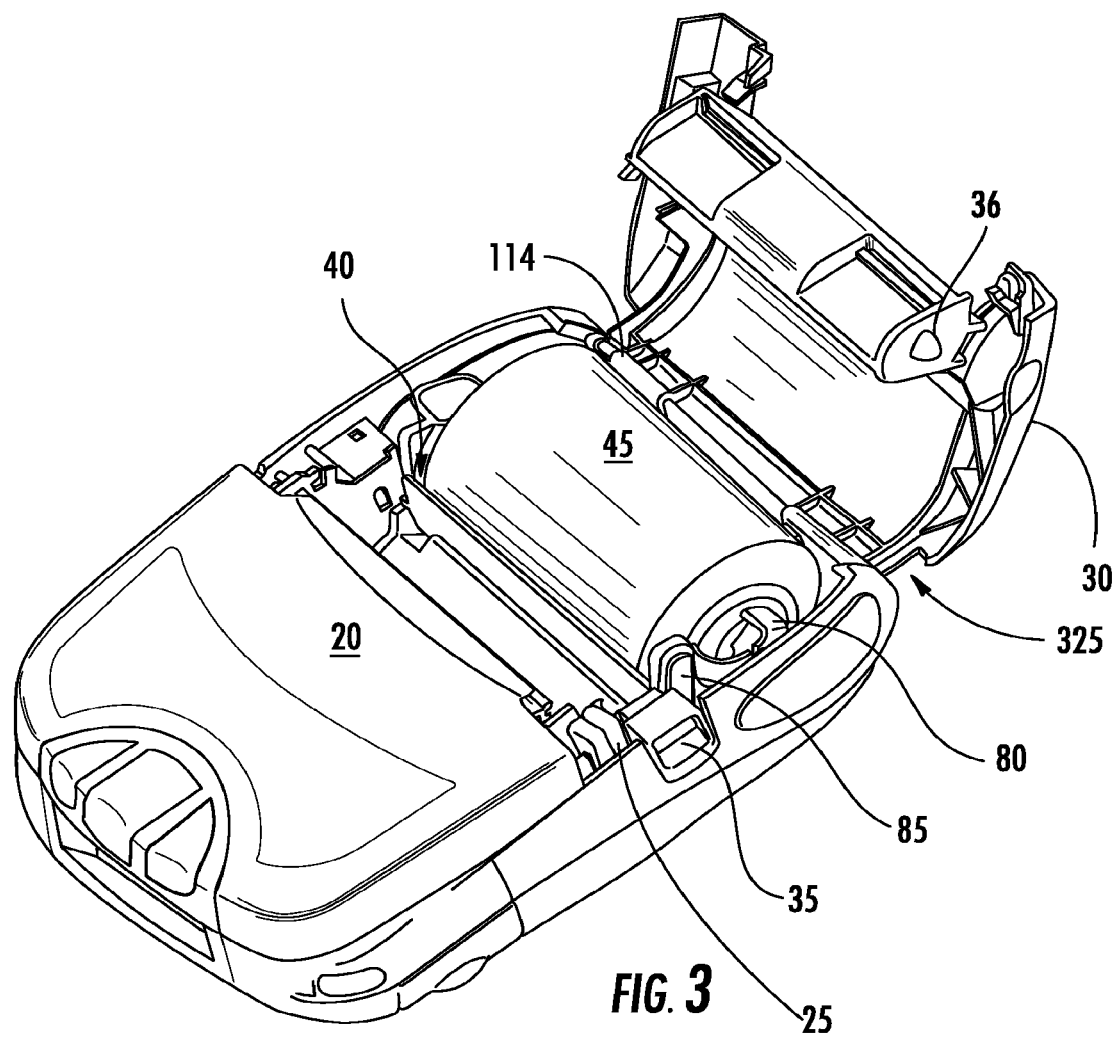
FIG. 3 illustrates a top view of the printer of FIG. 1 with a media cover in the opened media position and a ribbon cover in the closed ribbon position.

Referring again to FIG. 1, the printer 10 may include a ribbon cover 20 and a media cover 30. According to the illustrated embodiment, the media cover 30 can be opened using the media cover button 35. As seen in FIG. 3, the media cover 30 encloses a media receiving area 40, such as a cavity, which stores media 45, such as shipping labels. The media 45 can be inserted into the media support arms 80 and locked into place with the locking element 85 when the media cover 30 is closed. The ribbon cover 20 can be opened by pushing the ribbon cover button 25. The ribbon cover 20 encloses the ribbon receiving area 50, which stores the ribbon cartridge 52, as shown in FIG. 4.

Figure 4:
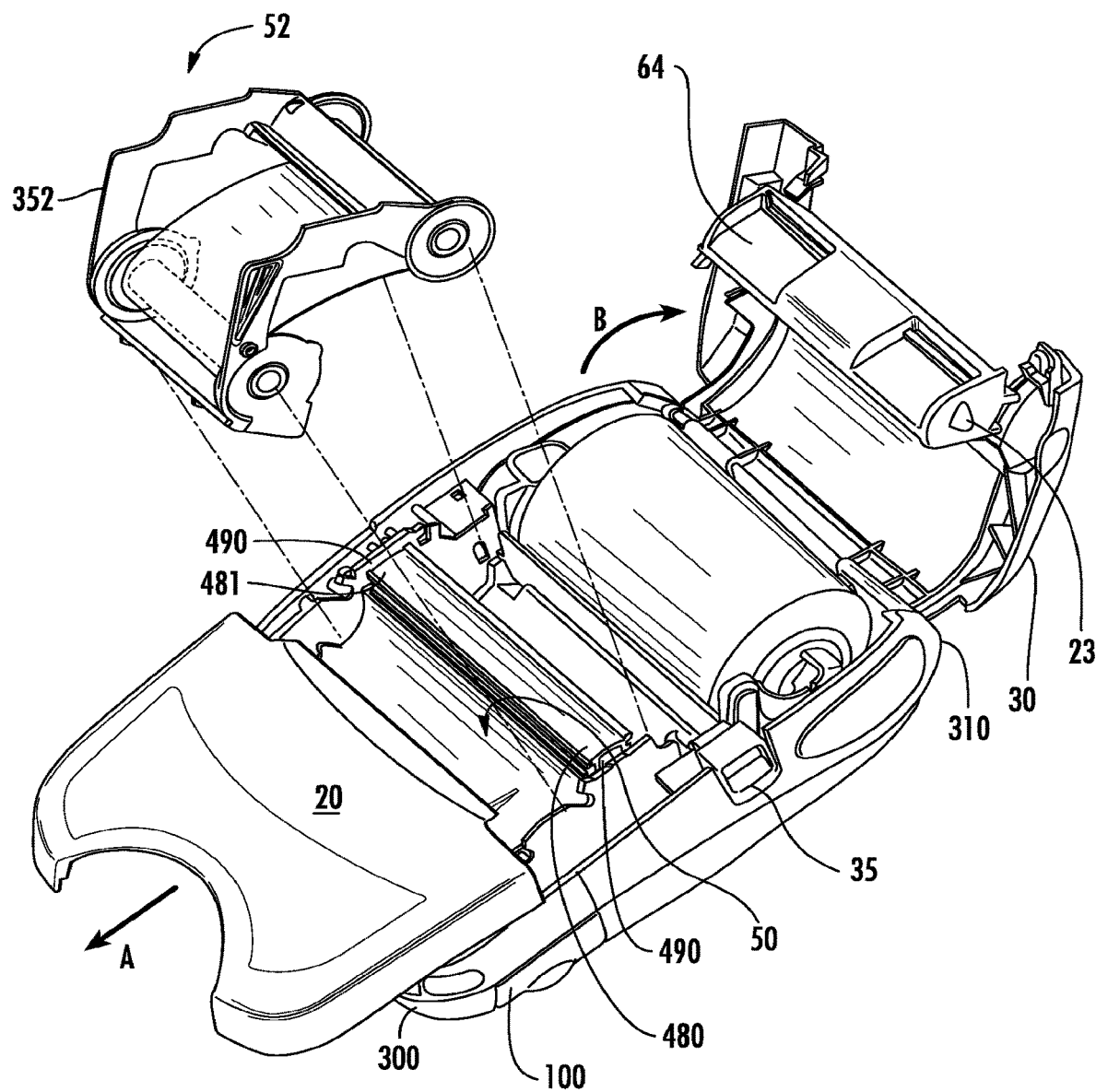
FIG. 4 shows the printer of FIG. 1 with the media cover in the opened media position and the ribbon cover in the opened ribbon position.

FIG. 4 also shows that the printer 10 may include one or more input data ports for importing data from or exporting data to an external source. Data imported could include printing commands, status requests, e-mail, printer settings, executable computer code, definitions for formatting data, fonts, graphics, passwords, or maintenance data. The data could be provided from a data storage medium, such as a computer, web site, portable data terminal, mobile phone, bar code reader, RFID reader, weigh scale, truck radio, or even another printer. Communication could be via a Universal Serial Bus (USB), Ethernet stack, wireless radio, or the like. These data ports can be located under the data port cover 100 and can allow for data to be input to communicate with the printer 10 during typical operation to help facilitate tasks like storing information or printing certain labels. Data could also be exported from these ports to help with product information storing and shipment tracking. Data exported could include the response to status requests, e-mail, network messages, printer status or settings, stored customer data, passwords, maintenance data, printer alert conditions, information read from RFID tags on the ribbon or supplies, battery status, external battery conditions, or information derived from sensors within the printer such as power conditions, supply measurements, temperature, or printhead conditions.

Various embodiments of the printer 10 may also utilize wired and/or wireless communications techniques and/or protocols for communications with, and control of, the printer 10 via the data ports described above. These communications techniques and/or protocols may allow for tethered and/or untethered operation of the printer 10. In this regard, the printer may include a communications interface that may be controlled by various means, including one or more processors. The one or more processors may be software and/or hardware configured and may control various communications hardware that may be used to implement communications with a remote device (e.g., a host device). The processor(s) may be configured to communicate using various wired and wireless communications techniques and/or protocols including serial and parallel communications and printing protocols, USB techniques, transmission control protocol/internet protocol (TCP/IP), radio frequency (RF), infrared (IrDA), or any of a number of different wireless networking techniques, including WLAN techniques such as, IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, Bluetooth (BT), ultra wideband (UWB) and/or the like. The printer 10 may implement these and other communications techniques and/or protocols directly with a host device in a point-to-point manner, or indirectly through an intermediate device such as an access point or other network entity. Various host devices that may be used to communicate with and/or control the operation of printer 10 may include computers, mobile computers, cameras, scales, global positioning system (GPS) devices, radios, mobile terminals, media players, or the like.

Figure 5:
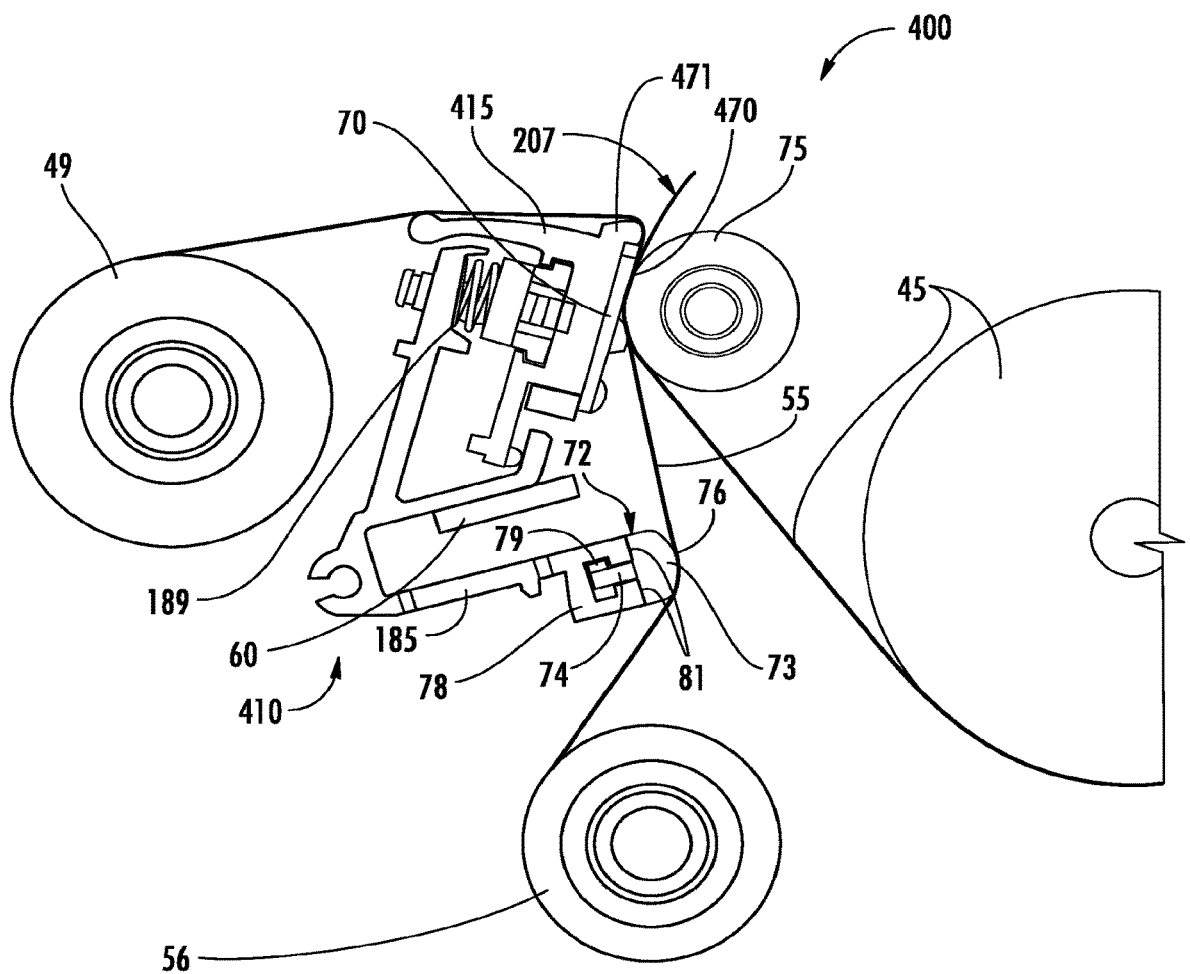
FIG. 5 is a cross-sectional representation of a printing mechanism of the printer of FIG. 1, showing the ribbon and media paths during printing, according to an exemplary embodiment.

As seen in FIG. 5, when the printer 10 is closed and in typical operation, the media 45 passes over an RFID coupler 60 for encoding and reading of an RFID tag that may be encoded in the media 45. When a ribbon 55 is used (such as in thermal transfer printing), the media 45 then contacts the ribbon 55 and the platen roller 75 for the printing of the label, as illustrated in FIG. 5. In printing applications where no ribbon is used (such as in direct thermal printing), the media would instead contact the thermal printhead 70 and the platen roller 75. Referring again to FIG. 1, once the label has been printed, the media exits the printer via the media exit slot 105. In embodiments, the printer 10 may include an optional peeler that functions to separate the printed media (e.g., the printed label) from a liner. In these cases, the peeled label may be discharged from the printer via the media exit slot 105, and the liner may be separately discharged via the liner exit slot 110.

The printer 10 can include many different features that may combine to help meet various printing needs. Several of the features that may be included are described below with reference to the figures.

Load Control Feature

Figure 6:
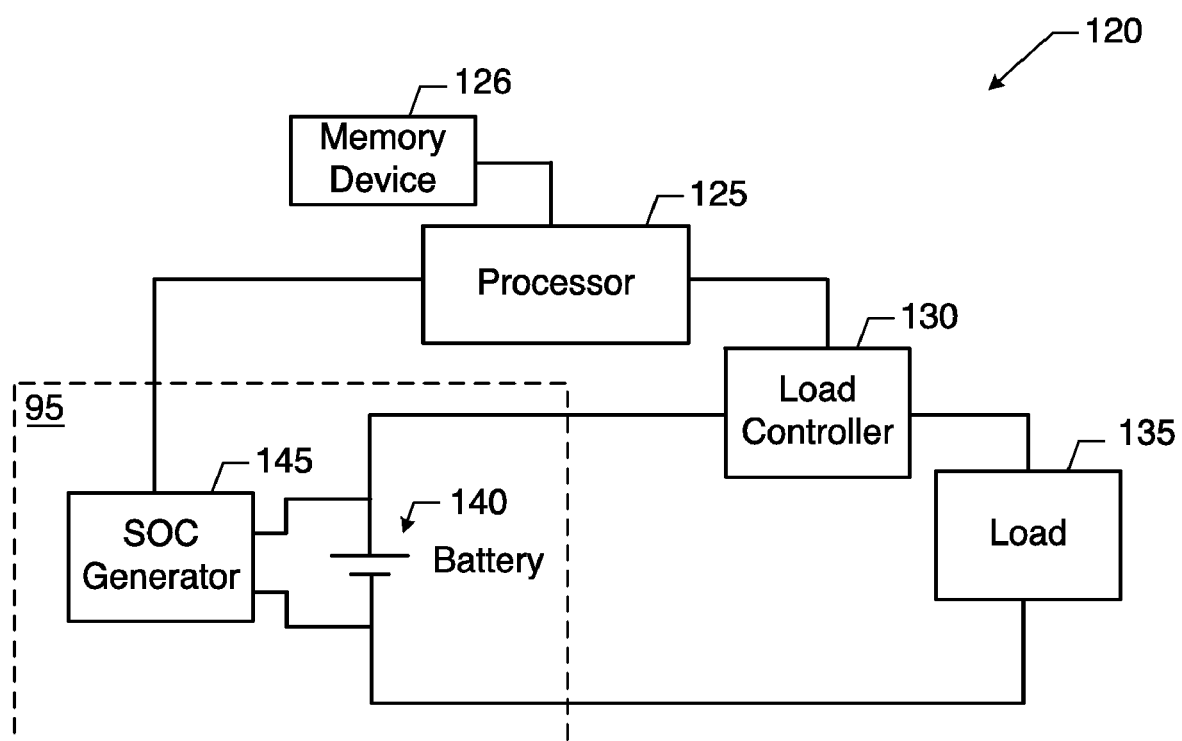
FIG. 6 is a schematic block diagram of an apparatus for load control according to an exemplary embodiment.

FIG. 6 depicts an apparatus 120 for load control according to an exemplary embodiment. The apparatus 120 and, in particular, the processor 125 and the memory device 126, may be configured to perform load control as described below with respect to FIGS. 6 and 7. The apparatus 120 may be embodied as, or utilized in combination with, any battery operated electronic device, such as a printer (e.g., the printer 10), computer, portable data terminal, scanner, RFID reader, portable device (e.g., music player, mobile telephone, digital camera, global positioning system (GPS) device), external battery (e.g., cart battery, forklift, vehicle), or the like. The apparatus 120 may include, control, and/or be in communication with a memory device 126, a processor 125, a smart battery 95, a load controller 130, and a load 135.

The memory device 126 may include, for example, volatile and/or non-volatile memory. The memory device 126 may be configured to store information, data, applications, instructions, or the like for enabling the apparatus to carry out various functions in accordance with exemplary embodiments. For example, the memory device 126 could be configured to buffer input data for processing by the processor 125. Additionally or alternatively, the memory device 126 may be configured to store instructions for execution by the processor 125. In some cases, the memory device 126 may be external to the load control apparatus 120, such as when the memory device 126 resides on a computer in communication with the apparatus 120.

The processor 125 may be embodied in a number of different ways. For example, the processor 125 may be embodied as a microprocessor, a coprocessor, a controller, or various other processing means or elements including integrated circuits such as, for example, an ASIC (application specific integrated circuit) or FPGA (field programmable gate array). In an exemplary embodiment, the processor 125 may be configured to execute instructions stored in the memory device 126 or otherwise accessible to the processor 125.

The load controller 130 may be any type of controllable switching device that may be used to interrupt and reestablish the flow of current from the smart battery 95 to the load 135. In this regard, the load controller 130 may be a switching relay, a transistor, a controllable switch, or the like. The load controller 130 may include an input that may receive a control signal and in response generate an open or closed circuit condition.

Further, the load 135 of the apparatus 120 may be any type of electrical load. In this regard the electrical load may be a printer, a printhead, an RFID encoder, a computer, a portable device (e.g., a music player, a mobile telephone, a digital camera, a global positioning system (GPS) device), or the like, as described above. The load 135 in FIG. 6 is powered by the smart battery 95.

The smart battery 95 may be a battery equipped with specialized hardware and/or software for monitoring a battery and transmitting information regarding the battery. In this regard, the smart battery 95 may include a battery 140 and a state of charge generator 145. The battery 140 may be any rechargeable, or non-rechargeable, power source and may include any type and number of battery cells. In some embodiments, the battery cells of the battery 140 may be lithium-ion, lithium-cobalt, lithium-polymer, nickel cadmium, nickel metal hydride, or the like. Similar non-battery rechargeable, or non-rechargeable, power sources may include fuel cells, capacitors, pressurized air tanks, radioactive decay devices, or microelectromechanical systems (MEMS) vibration cells. In some exemplary embodiments, the smart battery 140 may be removable from apparatus 120 and replaceable.

The state of charge generator 145 may be any electronic device that may be configured to monitor the battery 140 to determine the state of charge of the battery 140 and transmit communications with respect to the state of charge. In this regard, the state of charge of a battery may be an indication and/or prediction of the remaining battery capacity. Unlike voltage levels associated with a battery, a state of charge value for a battery need not respond to, or indicate, sudden changes in load (e.g., powering up a printer, powering up a thermal printhead in preparation for printing on a media, or the like). In this regard, the state of charge value may be substantially immune to sudden changes in load, unlike voltages, which may experience significant transient fluctuations when load is introduced or removed from a circuit.

In some embodiments, the state of charge value may provide a representation of a percentage of the maximum capacity of a fully charged battery. For example, a fully charged battery may have a state of charge value representing 100%. Similarly, a battery that is half charged, may have a state of charge value representing 50%. In this regard, over the life of a battery, the power output of the battery may degrade. As such, in some exemplary embodiments, the state of charge value may be determined relative to a fully charged battery experiencing a degraded power output. Additionally, in some exemplary embodiments, the state of charge value need not be determined relative to a fully charged battery, but rather a predetermined set point. As a result, in these embodiments, the state of charge value may represent a percentage above 100% or below 0%. Additionally, in some exemplary embodiments, information about the age of a battery, date of manufacture, manufacturing lot, design, part number, maintenance history, sales history, or usage history of the battery may also be used in determining the state of charge or its suitability for operation under certain conditions.

In this regard, the state of charge generator 145 may be configured to receive a request for a state of charge value and return (i.e., transmit) the state of charge value to the requesting entity (e.g., the processor 125) or another entity. Further, in some exemplary embodiments, the state of charge generator 145 may be configured to transmit a state of charge value at a regular interval (i.e., based on a timer). In some exemplary embodiments, the state of charger generator 145 may be configured to transmit a state of charge value at irregular intervals, such as, for example when the state of charge reaches one or more predetermined break points (e.g., 75%, 50%, 25%, 10%, 5%, or the like). Transmission of a state of charge value may be performed by providing the information in an analog signal or in a digital signal, such as a data packet.

In some exemplary embodiments, the processor 125 of the apparatus 120 may be configured to provide for transmission of a request to the smart battery 95 and, in turn, the state of charge generator 145. The request may be any type of communication that causes the state of charge generator to respond by providing a representation of a state of charge value to the processor 125. In some exemplary embodiments, the processor may be configured to provide for transmission of a request, where the request is a smart battery message as described in Smart Battery Data Specifications, such as, *Smart Battery Data Specification*, Rev. 1.1, Dec. 11, 1998, which is hereby incorporated by reference in its entirety. The smart battery message may be a RelativeStateOfCharge( ) message or an AbsoluteStateOfCharge( ) message.

In some embodiments, the smart battery 95 may be configured to transmit, receive, and or store various types of data regarding the state of the battery. Such data may include the number of cycles that the battery has experienced, the date the battery was first used, the theoretical capacity of a new battery, the theoretical voltage of a new battery, the predicted battery capacity when the battery is fully charged, the relative health of the battery (e.g., "good," "replace," or "poor") based on the number of times the battery has cycled, the date the battery was manufactured, the predicted remaining battery capacity, the serial number of the battery, and/or the internal temperature of the battery.

The processor 125 may also be configured to receive a representation of the state of charge. The processor 125 may receive the representation of the state of charge from the state of charge generator 145 based on the state of charge generator's monitoring of the battery 140. In this regard, the representation of the state of charge may be received as an analog or digital signal. In some exemplary embodiments, the representation of the state of charge may be received as a data packet. The representation of the state of charge value may be a converted, encoded, translated, etc. version of the state of charge value. In some exemplary embodiments, receiving the representation of the state of charge value may also include converting, decoding, translating, etc. the representation of the state of charge value into the state of charge value.

The processor 125 may be further configured to compare the state of charge value with a state of charge load control threshold. The state of charge load control threshold may be a predetermined value that may be compared to the state of charge value. In some exemplary embodiments, the state of charge load control threshold may be set at a battery capacity where power from the battery 140 to the load 135 may be interrupted. For example, the state of charge load control threshold may be set at 5%, and, as a result, when the state of charge value reaches or falls below 5%, actions may be implemented to interrupt power from the battery to the load, so as not to completely discharge the battery. The state of charge load control threshold may be stored in, for example, the memory device 126, and the processor 125 may be configured to retrieve the state of charge load control threshold from the memory device 126 for comparison.

In some exemplary embodiments, the state of charge value may be averaged with one or more previously received state of charge values to determine an average state of charge value. In this regard, the average state of charge value may be used in the comparison with the state of charge load control threshold. As such, the processor 125 may be configured to receive and store a plurality of state of charge values. The plurality of state of charge values may be stored in memory device 126. Accordingly, the processor 125 may be configured to average the stored state of charge values. The plurality of received state of charge values may be received over a predetermined period of time. For example, an average may be determined for all values received over a period of 1 second. Further, in some exemplary embodiments, an average state of charge value may be determined based on some predetermined number of received state of charge values. For example, the average state of charge value may be determined based on the last six received state of charge values. In this example, a first-in first-out algorithm may be utilized for the state of charge values such that when a new state of charge value is received, the oldest state of charge value may be discarded. The processor 125 may therefore be configured to determine the average of the stored state of charge values, the variation in those values, or the trend of those values with respect to time or other operating conditions of the printer.

In this regard, the processor 125 may be configured to provide for transmission of a power down signal, or a modification of a power down signal, in response to the state of charge value, or the average state of charge value, surpassing the state of charge load control threshold. The term surpassing, and variations of the term (i.e., surpass, surpassed, or the like), may be defined to mean reaching, exceeding, falling below, or the like. Further, the power down signal may be any signal output by the processor that may indicate that the state of charge value, or the average state of charge value, has surpassed the state of charge load control threshold. In some exemplary embodiments, the modification of a signal (e.g., the power down signal) may be a change in a power or voltage level of the signal. Further, in some exemplary embodiments, in response to the state of charge signal falling below the state of charge load control threshold, the processor 125 may transmit a power down signal, or a modification of a power down signal, to the load controller 130 causing the load controller 130 to interrupt power to the load 135. Similarly, in some exemplary embodiments, in response to the state of charge signal reaching or exceeding the state of charge load control threshold (i.e., due to charging of the battery), the processor 125 may transmit a power down signal, or a modification of a power down signal, to the load controller 130 causing the load controller 130 to cease interruption of power (i.e., allow power to flow) to the load.

Figure 7:
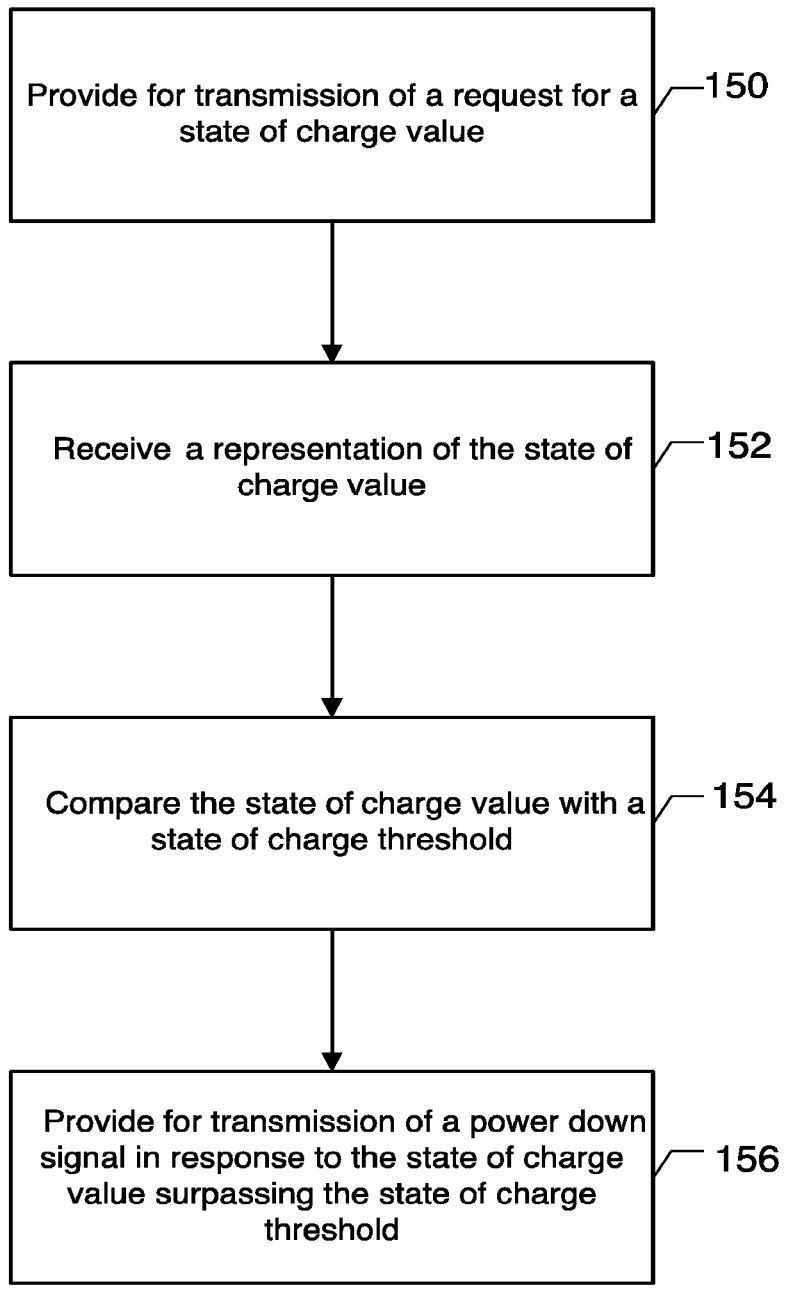
FIG. 7 is a flowchart according to a method for load control according to an exemplary embodiment.

FIG. 7 illustrates a method for performing load control according to various exemplary embodiments of the present invention. The exemplary method of FIG. 7 may be implemented by the apparatus 120 or the processor 125. Various steps or operations of the exemplary method of FIG. 7 may be omitted, and various orderings of the steps or operations are contemplated.

The exemplary method of FIG. 7 may include providing for transmission of a request for a state of charge value at 150. The exemplary method may also include receiving a representation of the state of charge value at 152. At 154, the exemplary method may include comparing the state of charge value with a state of charge load control threshold. In some exemplary embodiments, comparing the state of charge value with a state of charge load control threshold may include comparing a state of charge value that is an average state of charge value to the state of charge load control threshold. At 156, the exemplary method may also include providing for transmission of a power down signal, or a modification of a power down signal, in response to the state of charge value surpassing the state of charge load control threshold.

Battery Charge Control Feature

Figure 8:
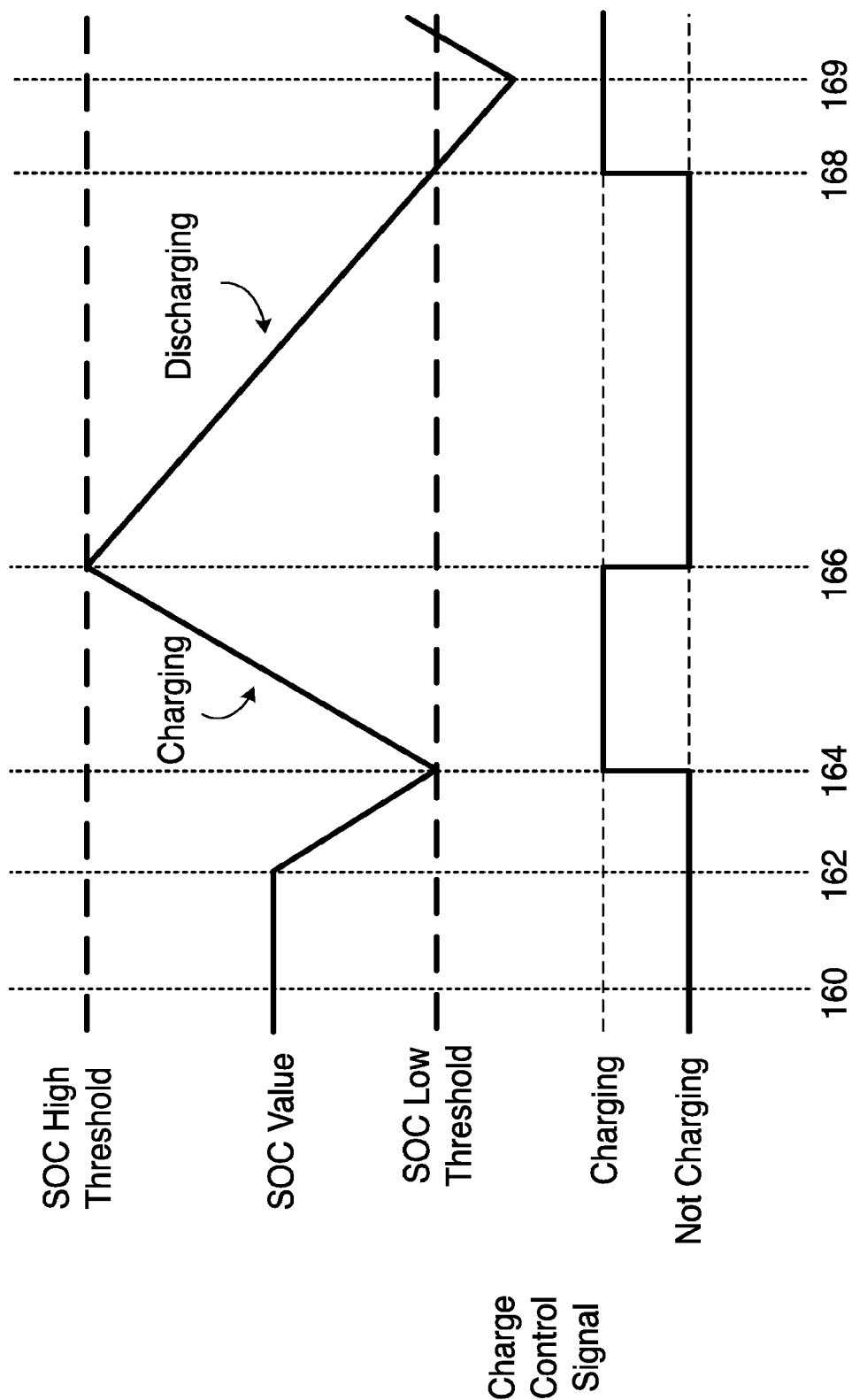
FIG. 8 is a diagram representing a relationship between a state of charge value, a state of charge low threshold, a state of charge high threshold, and a charge control signal according to an exemplary embodiment.
Figure 9:
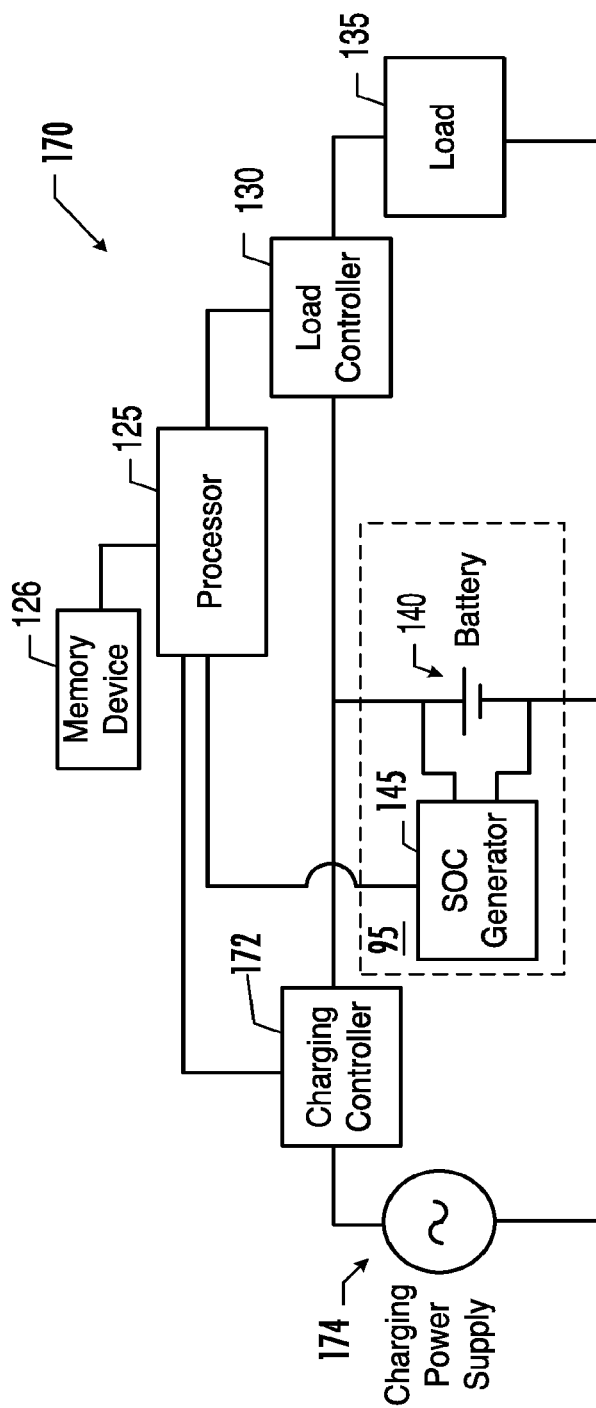
FIG. 9 is a schematic block diagram of an apparatus for battery charge control according to an exemplary embodiment.
Figure 10:
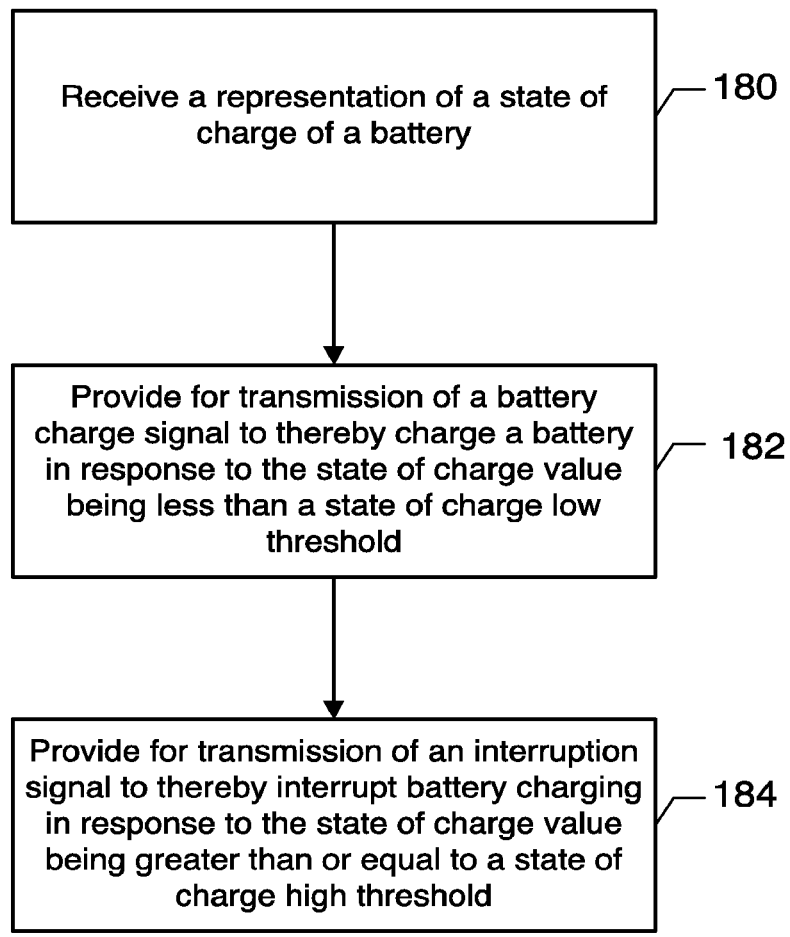
FIG. 10 is a flowchart according to a method for battery charge control according to an exemplary embodiment.

FIGS. 8, 9, and 10 describe exemplary embodiments that may perform battery charge control, such as charge control of the printer 10. The exemplary embodiments describing aspects of FIGS. 8, 9, and 10 may, but need not, be combined with the other aspects of the present invention as described herein.

Exemplary embodiments may include a state of charge low threshold and a state of charge high threshold. In this regard, the state of charge low threshold may be set such that when a state of charge value of a battery falls below the state of charge low threshold, charging of the battery may be initiated. Further, when the state of charge value of a battery rises to, or exceeds, the state of charge high threshold, battery charging may be interrupted.

By setting a state of charge high threshold, charging of a battery may be discontinued before the battery achieves a maximum charge. In some instances, charging a battery to a maximum charge may be detrimental to the operation of the battery over the lifetime of the battery. Further, by setting a state of charge low threshold, a battery need not experience continuous recharging cycles when the state of charge of the battery falls below the state of charge high threshold. These continuous recharging cycles may also be detrimental to battery operation over the lifetime of the battery. Rather the state of charge low threshold may provide for a discharge region between the state of charge low threshold and the state of charge high threshold where the battery need not be re-charged to the state of charge high threshold until the state of charge of the battery falls to the state of low threshold. By implementing the thresholds in this manner, continuous re-charging of the battery may be avoided when the battery is connected to a charger and the state of charge of the battery falls below the state of charge high threshold.

With regard to battery charge control, the signal diagram of FIG. 8 provides an exemplary scenario. In this regard, embodiments may receive a state of charge value and control the charging of a battery based on the state of charge value. The state of charge value may be compared to a state of charge low threshold and a state of charge high threshold.

In the exemplary scenario of FIG. 8, at 160 the state of charge value is between the state of charge low threshold and the state of charge high threshold. At 160, the battery may be connected to a charging power supply capable of charging the battery through battery charging control circuitry (e.g., a battery charge controller). However, since the state of charge value is above the state of charge low threshold, charging of the battery is not initiated and the charge control signal remains at a level such that the battery is not charged.

At 162, the battery begins to discharge and the state of charge value falls to the state of charge low threshold at 164. In response to the state of charge falling to the state of charge low threshold, the charge control signal may be modified such that charging is initiated at 164, since the battery is connected to a charging power supply. Charging may continue until the state of charge value reaches the state of charge high threshold at 166. In response to the state of charge reaching the state of charge high threshold the charge control signal may be modified such that charging is interrupted at 166. In the exemplary scenario of FIG. 8, the charging power supply may be disconnected from the battery charge control circuitry, and, in turn, the battery, possibly for mobile operation of the device being powered by the battery sometime after 166 and before 168.

From 166 to 168, the state of charge value may fall while the battery is discharging, for example, due to the operation of a device powered by the battery. At 168, the state of charge value again reaches the state of charge low threshold, and the charge control signal may be modified again such that charging may be initiated at 168. However, since the charging power supply is no longer connected to the battery charge control circuitry, charging of the battery may not commence. At 169, the charging power source may be connected to the battery control circuitry, and since the charge control signal has been modified to allow for charging of the battery, battery charging may commence.

FIG. 9 depicts an additional exemplary apparatus 170 for performing battery charge control according to various exemplary embodiments of the present invention. The apparatus 170 and, in particular, the processor 125 and the memory device 126 may be configured to perform various aspects of battery charge control as described with respect to FIGS. 8, 9, and 10, in addition to, or in lieu of, being configured to perform various aspects of load control as described with respect to FIGS. 6 and 7. The apparatus 170 may be embodied as scenario 160 of FIG. 8 and may include some or all of the components of apparatus 120, such as the smart battery 95 (including the battery 140 and the state of charge generator 145), the load controller 130, and the load 135, which may be embodied and/or operate as described above. Additionally, the apparatus 170 may include a charging controller 172 and a charging power supply 174.

The charging controller 172 may be any type of controllable switching device that may be used to interrupt and reestablish the flow of current from the charging power source 174 to the battery 140. In this regard, the charging controller 172 may be a switching relay, a transistor, a controllable switch, or the like. The charging controller 172 may include an input that may receive a control signal and in response generate an open or closed circuit condition.

The charging power supply 174 may be any type of power source that may be used to charge the battery 140. In this regard, the charging power supply 174 may originate from, for example, a wall outlet, a generator, an alternator, another battery, or the like. In some exemplary embodiments, the charging power supply 174 may be external to the apparatus 170 and/or may be removable from the charging controller 172 and/or the battery 140. In these embodiments, when the charging power supply 174 is removed, the charging power supply 174 may be unable to charge the battery 140. In some exemplary embodiments, the charging controller 172 may also be removable with the charging power supply 174.

The processor 125 may be configured to receive a state of charge value as described above. The processor 125 may also be configured to compare the state of charge value, or an average state of charge value, to a state of charge low threshold and a state of charge high threshold. The state of charge low threshold and the state of charge high threshold may be stored in, for example, the memory device 126, and the processor 125 may be configured to retrieve the state of charge low threshold and the state of charge high threshold from the memory device 126 for comparison.

The processor 125 may also be configured to provide for transmission of a charge control signal, or a modification to a charge control signal, in response to the state of charge value being less than the state of charge low threshold. In this regard, the charge control signal, or the modification of a charge control signal may initiate charging of a battery. For example, the processor 125 may provide the charge control signal, or modification thereof, to charging controller 172, and in response, the charging controller 172 may generate a closed circuit between the charging power supply 174 and the battery 140, thereby charging the battery 140. In instances where the charging power supply 174 is removed, the processor 125 may provide the charge control signal, or modification thereof, to the charging controller 172, and the charging controller 172 may respond; however, charging may not initiate until the charging power supply 174 is connected to the charging controller 172 and/or the battery 140.

The processor 125 may also be configured to provide for transmission of a charge control signal, or a modification to a charge control signal, in response to the state of charge value being greater than or equal to the state of charge low threshold. In this regard, the charge control signal, or the modification of a charge control signal may interrupt charging of a battery. For example, the processor 125 may provide the charge control signal, or modification thereof, to the charging controller 172, and in response, the charging controller 172 may generate an open circuit between the charging power supply 174 and the battery 140, thereby interrupting the charging of the battery 140.

FIG. 10 illustrates a method for performing battery charge control according to various exemplary embodiments. The exemplary method of FIG. 10 may be implemented by the apparatus 170 or the processor 125. Various steps or operations of the exemplary method of FIG. 10 may be omitted, and various orderings of the steps or operations are contemplated.

The exemplary method of FIG. 10 may include receiving a representation of the state of charge value at 180. In this regard, the exemplary method may also include providing for transmission of a request for a state of charge value, and receiving the representation of the state of charge value in response to the request. At 182, the exemplary method may include providing for transmission of a battery charge signal, or a modification of a battery charge signal, to thereby charge a battery in response to the state of charge value being less than a state of charge low threshold. At 184, the exemplary method may include providing for transmission of a battery charge signal, or a modification of a battery charge signal, to thereby interrupt battery charging in response to the state of charge value being greater than or equal to a state of charge high threshold. In some exemplary embodiments, an average state of charge value may be used as the state of charge value in 182 and/or 184.

With or without these approaches, information about the battery, its state of charge, its current condition, or its usage history could be used to moderate operation of the printer, display instructions to users, or alert external systems via the external communication systems. For instance, in some applications, printing may be sped up or print darkness may be reduced as the battery discharges in order to maximize the amount of printing from the available charge. A warning could be printed out, printing could be delayed, or a message could be rendered on the user display to warn of low charge conditions. This could be particularly valuable if enough power remains for basic communicating or printing a single label, but there is insufficient power for printing a full batch of labels or for downloading a large data update. Radio communication or RFID encoding could also be temporarily suspended to conserve power.

FIGS. 7 and 10 are flowcharts of systems, methods, and program products according to exemplary embodiments of the invention. It will be understood that each block, step, or operation of the flowcharts, and combinations of blocks, steps or operations in the flowcharts, can be implemented by various means, such as hardware, firmware, and/or software including one or more computer program code portions, program instructions, or executable program code portions. For example, one or more of the procedures described above may be embodied by computer program code instructions. In this regard, the computer program instructions which embody the procedures described above may be stored by a memory device of the apparatus and executed by a processor in the apparatus. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block (s), step(s), or operation(s). These computer program instructions may also be stored in a computer-readable memory that can direct a computer, a processor, or other programmable apparatus to function in a particular manner, such that the instructions stored in the computer-readable memory produce an article of manufacture including instruction means which implement the function specified in the flowcharts block(s), step(s), or operation(s). The computer program instructions may also be loaded onto a computer, processor, or other programmable apparatus to cause a series of operational steps to be performed on the computer, processor, or other programmable apparatus to produce a computer-implemented process such that the instructions which execute on the computer, processor, or other programmable apparatus provide steps for implementing the functions specified in the flowcharts block(s), step(s), or operation(s).

Accordingly, blocks, steps, or operations of the flowcharts support combinations of means for performing the specified functions, combinations of steps for performing the specified functions and program instruction means for performing the specified functions. It will also be understood that one or more blocks, steps, or operations of the flowcharts, and combinations of blocks, steps, or operations in the flowcharts, can be implemented by special purpose hardware-based computer systems which perform the specified functions or steps, or combinations of special purpose hardware and computer instructions.

Ribbon Cartridge Insertion Feature

Another feature that may be included in a portable printer according to an exemplary embodiment is a ribbon cartridge insertion feature. The ribbon cartridge insertion feature provides a user with access to a ribbon receiving area 50 (shown in FIG. 4), which may include one or more cavities, for example, to allow a user to remove an old ribbon cartridge and/or to allow a user to install a new ribbon cartridge. More specifically, the ribbon cartridge insertion feature allows the user to access the ribbon cartridge without requiring removal of the media. In this way, as described below, the user may replace or install a ribbon cartridge without having to first remove the media from the media receiving area.

Referring to FIG. 1, when the ribbon cover 20 and the media cover 30 of the printer 10 are closed, a user can depress the media cover button 35 to open the media cover 30. The media cover button 35 may be located in any location that is accessible to the user when the ribbon and media covers 20, 30 are closed, such as on a side of the printer 10. The media cover button 35 may engage an internal portion of the media cover 30 in the closed media position such that depressing the button 35 releases the media cover 30 so that it may be opened by a user to expose the media 45 and/or the media receiving area 40, as shown in FIG. 3. For example, depressing the media cover button 35 may release a spring-loaded tab 36 located on a shield housing 64 that is integral to or otherwise attached to the media cover 30. Disengagement of the spring-loaded tab 36 may also serve to urge the media cover 30 away from the rest of the printer housing, towards the opened media position illustrated in FIG. 3.

In the depicted embodiments, opening of the media cover 30 exposes a ribbon cover button 25, which is configured to provide access to the ribbon cartridge. Depressing the ribbon cover button 25 allows the ribbon cover 20 to move to an opened ribbon position and substantially simultaneously raises an installed ribbon cartridge 52 away from the printer housing 12 such that the ribbon cartridge 52 is disposed in an accessible position. In the accessible position, the ribbon cartridge 52 may be grasped and removed by the user, as shown in FIG. 4 and described below. Likewise, a new ribbon cartridge 52 may be installed by placing the ribbon cartridge 52 in the ribbon receiving area 50 and closing the ribbon cover 20 to urge the ribbon cartridge 52 into an installed position for printing.

Figure 11:
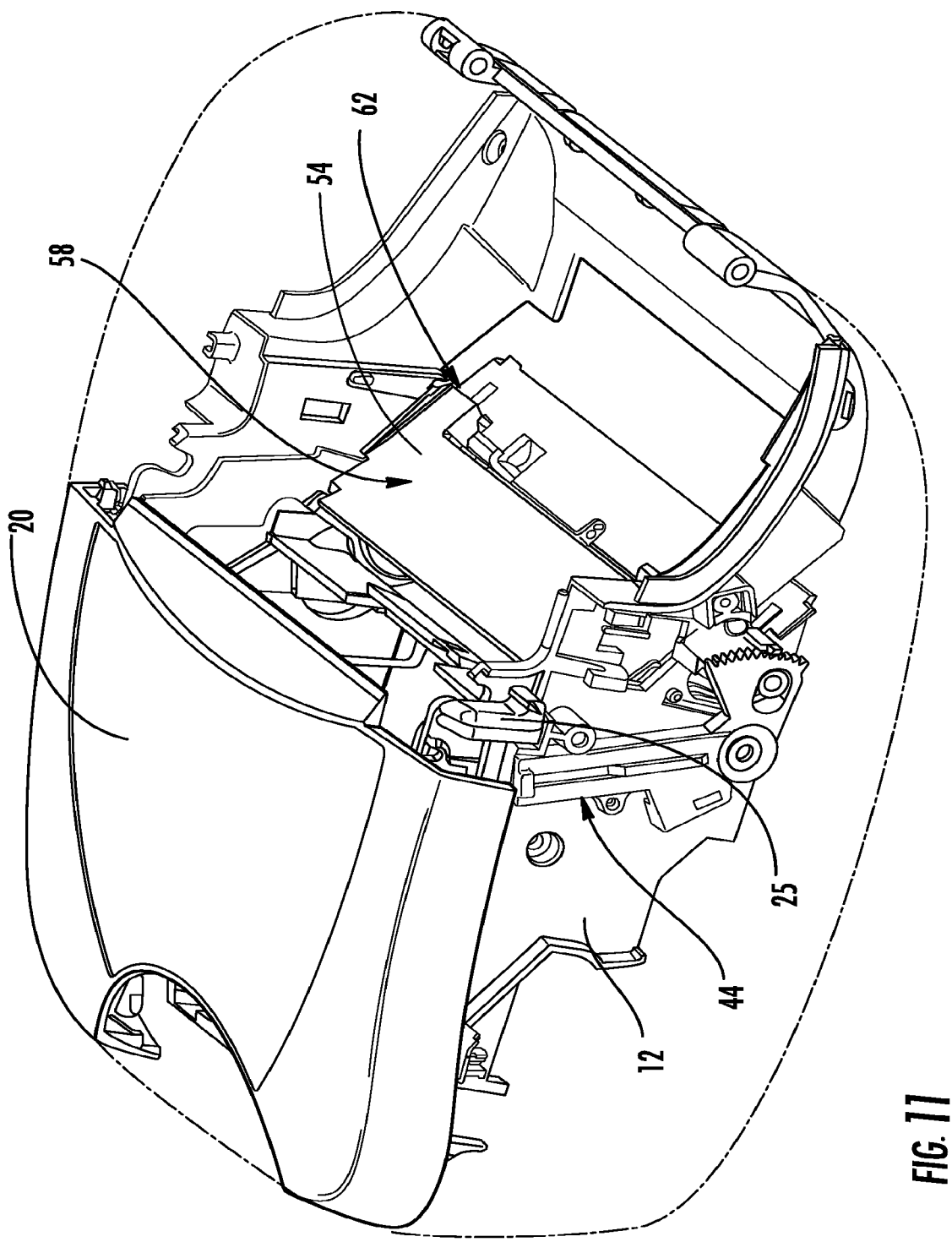
FIG. 11 shows a partial view of the printer of FIG. 1 with the ribbon cover in a closed ribbon position.
Figure 12:
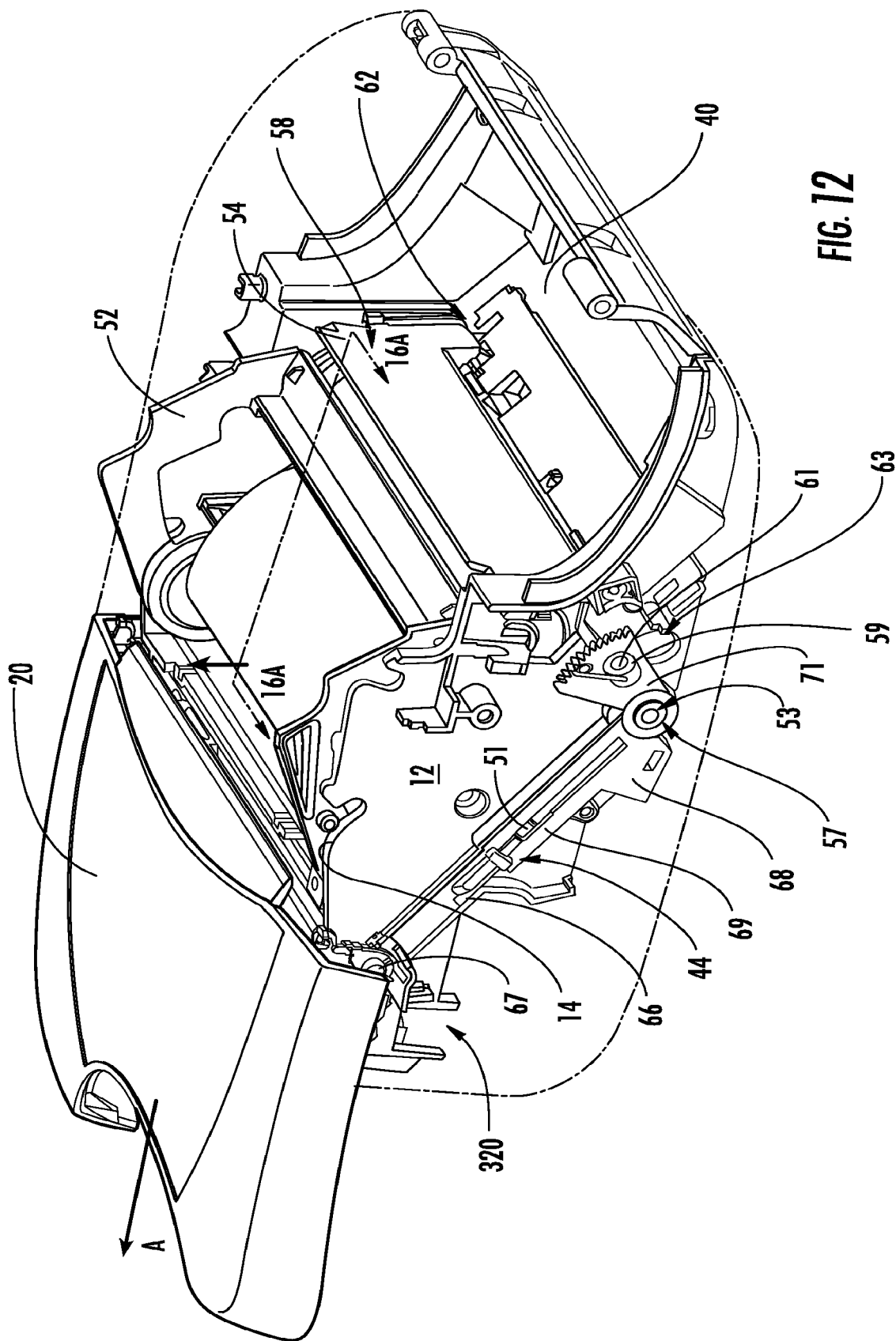
FIG. 12 shows a partial view of the printer of FIG. 1 with the ribbon cover in an opened ribbon position.

FIG. 11 shows a cut-away partial view of the top of the printer 10 with the ribbon cover 20 in the closed ribbon position, and FIG. 12 shows a similar view with the ribbon cover 20 in the opened ribbon position. The ribbon cover 20 may be generally spring-loaded or otherwise biased to the opened ribbon position and may be held in the closed ribbon position at least in part by the ribbon cover button 25. In this way, depressing the ribbon cover button 25 releases the ribbon cover 20 and facilitates movement of the ribbon cover 20 away from the ribbon receiving area 50 to the opened ribbon position. The ribbon cover 20 may be configured to move to the opened ribbon position in various ways. For example, in FIGS. 11 and 12, the ribbon cover 20 remains engaged with the printer housing 12 along two sides of the ribbon cover 20 and slides away from the media cover 30 (shown in FIG. 4) following a cam surface 14 on each side of the printer housing 12.

Figure 16:
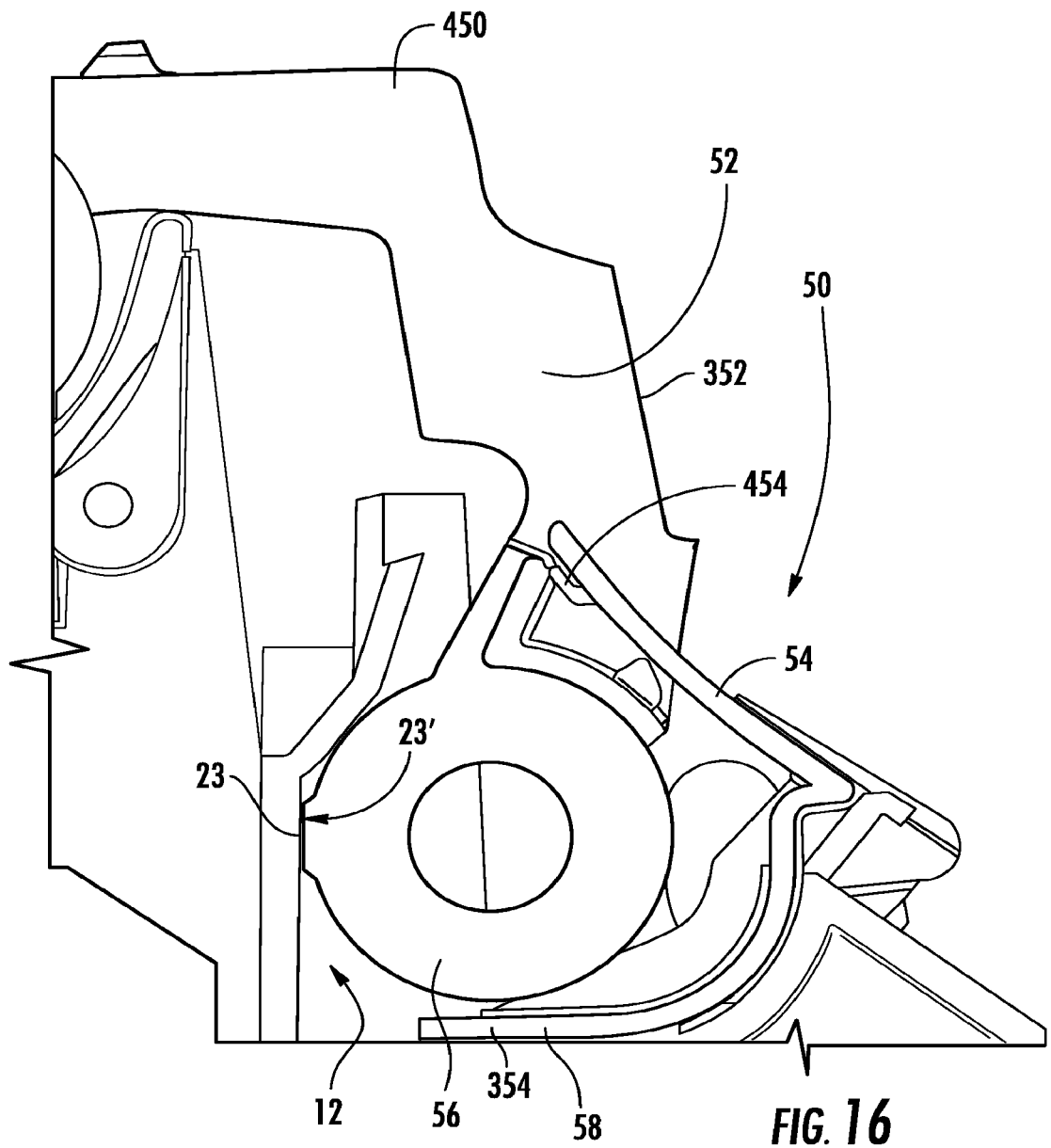
FIG. 16 is a cross-sectional view of a portion of the printer with the ribbon cartridge received into the printer housing of FIG. 13.
Figure 16A:
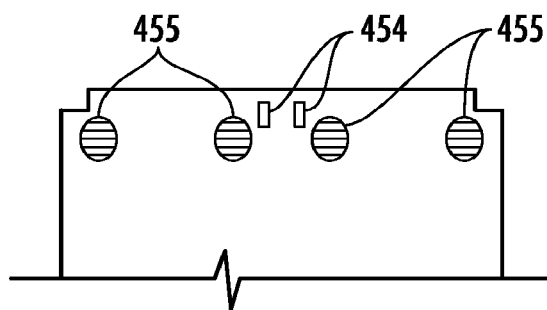
FIG. 16A is a detail view of the inside surface of the securing portion of the ribbon cartridge retaining feature of FIG. 16.

The ribbon cartridge 52 (shown separately in FIG. 13) is configured to fit within the ribbon receiving area 50 with the supply spool 56 being received by a ribbon cartridge retaining feature 58. The ribbon cartridge retaining feature may be a tray, as shown in the depicted embodiment, or one or more clips configured to engage at least a portion of the ribbon cartridge. The ribbon cartridge retaining feature 58 may include a lifting portion 354 configured to support at least part of the ribbon cartridge 52, and a securing portion 54 configured to maintain the ribbon cartridge 52 in the installed position when the ribbon cartridge retaining feature 58 is in an operational position. The ribbon cartridge retaining feature 58 may have, for example, a "U" shape such that the supply spool 56 rests in the trough of the "U" and is supported by the lifting portion 354. When the ribbon cover 20 is in the closed ribbon position, as seen in FIG. 11, the ribbon cartridge retaining feature 58 may be configured to move to the operational position, wherein the securing portion 54 (i.e., one leg of the "U" shape) covers the supply spool 56, separating the ribbon receiving area 50 from the media receiving area 40 and holding the ribbon cartridge 52 within the ribbon receiving area 50. In this regard, the securing portion 54 may include contact areas configured to engage the ribbon cartridge 52 to secure the ribbon cartridge 52 in the installed position when the ribbon cartridge retaining feature 58 is in the operational position. As shown in FIGS. 16 and 16A, for example, the contact areas may include tabs 454 and/or ridges 455 configured to contact the ribbon cartridge 52 and urge it into the installed position for printing operations.

When the ribbon cover 20 moves from the closed ribbon position to the opened ribbon position, illustrated in FIG. 12, the ribbon cartridge retaining feature 58 is rotated towards the media receiving area 40 (i.e., in the clockwise direction in FIGS. 11 and 12) from the operational position to the retrieval position, thereby raising the supply spool 56 out of the ribbon receiving area 50 and moving the ribbon cartridge 52 from the installed position to the accessible position. In this regard, the ribbon cartridge retaining feature 58 may be connected to the printer housing 12 via a ribbon cartridge hinge 62, such that ribbon cartridge retaining feature 58 is able to rotate about the ribbon cartridge hinge 62 when the ribbon cover 20 moves between the closed and opened ribbon positions.

The ribbon cover 20 is connected to the ribbon cartridge retaining feature 58 via a linkage 44, as shown in FIGS. 11 and 12. The linkage 44 may include a sliding component 66 that connects to the ribbon cover 20 and a rotating component 68 that connects to the ribbon cartridge retaining feature 58. A first end 47 of the sliding component 66 may be connected to the ribbon cover 20 by a hinge pin 67 (shown in FIG. 12) such that as the ribbon cover 20 moves between the closed and open positions the sliding component 66 is able to rotate with respect to the ribbon cover 20 about the hinge pin 67.

The rotating component 68 may have an "L" shape, with a first leg 69 of the rotating component 68 engaging a second end 51 of the sliding component 66 and a second leg 71 of the rotating component 68 connecting to the ribbon cartridge retaining feature 58. In this regard, the first leg 69 of the rotating component 68 may include a hollow portion that is configured to receive the second end 51 of the sliding component 66 such that the second end 51 of the sliding component 66 is able to slide along at least a portion of the length of the first leg 69.

The area of the printer housing 12 proximate the second leg 71 of the rotating component 68 may include a slot 63 through which an extension 61 of the ribbon cartridge retaining feature 58 passes to engage the second leg 71 of the rotating component 68. Thus, the second leg 71 may include a hole 59 that is configured to receive the extension 61 of the ribbon cartridge retaining feature 58. The hole 59 may be circular or slightly oblong to provide additional tolerance for receiving the extension 61. The second leg 71 may have various configurations. For example, the second leg 71 may incorporate a sector gear, as shown in FIGS. 11 and 12, that is configured to engage an optional damper (not shown) to slow down the motion of the ribbon cover 20 when the ribbon cover 20 is moved from the closed position to the open position.

The first and second legs 69, 71 of the rotating component 68 may be substantially perpendicular to each other, as shown in the figures, or may join at some other angle suitable to allow the movement of the linkage 44 and other components. The legs 69, 71 may define an aperture 57 at their juncture that is configured to receive a protrusion 53 of the printer housing 12, thereby forming a pivot point. In this way, the rotating component 68 is able to rotate about the protrusion 53, as described below.

Referring now to FIG. 11, when the ribbon cover 20 is in the closed ribbon position, the second end 51 of the sliding component 66 is received within the hollow portion of the first leg 69 of the rotating component 68 such that the second end is in a position proximate the protrusion of the printer housing 12. In the closed ribbon position of this example, the first leg 69 of the rotating component 68 is substantially perpendicular to the plane of the ribbon cover 20. The second leg 71 of the rotating component 68 is positioned such that the extension 61 of the ribbon cartridge retaining feature 58 is held at one end of the slot 63 corresponding to a retracted ribbon cartridge retaining feature 58. Thus, when the ribbon cover 20 is in the closed ribbon position, the securing portion 54 of the ribbon cartridge retaining feature 58 substantially covers the supply spool 56 and limits access to the ribbon cartridge 52.

Upon actuation of the ribbon cover button 25, the ribbon cover 20 moves from the closed ribbon position (FIG. 11) to the opened ribbon position (FIG. 12). As the ribbon cover 20 moves from the closed ribbon position to the opened ribbon position, the sliding component 66 pivots about the hinge pin 67 and slides within the hollow portion of the first leg 69 of the rotating component 68, moving the second end 51 of the sliding component 66 away from the protrusion 53 of the printer housing 12. As the sliding component 66 pivots and slides within the first leg 69, the rotating component 68 is rotated about the protrusion 53, and the extension 61 of the ribbon cartridge retaining feature 58 is moved along the slot 63 by the second leg 71 of the rotating component 68. In addition, as the rotating component 68 rotates, the extension 61 is moved along an arcuate path via the slot 63, which serves to rotate the ribbon cartridge retaining feature 58 from the operational position (FIG. 11) to the retrieval position (FIG. 12), thereby presenting the ribbon cartridge 52 to the user. For example, the extension 61 may be an extension of the lifting portion 354 (shown in FIG. 16) of the ribbon cartridge retaining feature 58. Thus, as the extension 61 is rotated to a raised position via the rotating component 68, the ribbon cartridge retaining feature 58 likewise moves towards the retrieval position described above.

When the user has accessed the ribbon cartridge 52, such as to remove the old cartridge and install a new cartridge, the user may close the ribbon cover 20, for example, by manually moving the cover 20 from the opened ribbon position of FIG. 12 to the closed ribbon position of FIG. 11. Closing the ribbon cover 20 serves to push the sliding component 66 back into the hollow portion of the rotating component 68, rotating the rotating component 68 towards the closed position, moving the extension 61 of the ribbon cartridge retaining feature 58 via the slot 63, and moving the ribbon cartridge retaining feature 58 to the operational position so that the ribbon cartridge 52 is ready for printing. As the ribbon cover 20 reaches the closed ribbon position shown in FIG. 11, the cover 20 may engage the ribbon cover button 25 (directly or indirectly) such that the ribbon cover 20 is held in the closed ribbon position and the ribbon cover button 25 is ready to open the ribbon cover 20 upon its next actuation. Furthermore, once the ribbon cover 20 has been closed and the ribbon cartridge 52 is in the operational position, there is adequate clearance for moving the media cover 30 into the closed media position (see FIG. 1) such that the printer 10 may be used for printing operations. In other words, the media cover 30 may be blocked from moving to the closed media position when the ribbon cartridge retaining feature 58 is in the retrieval position, requiring that the ribbon cover 20 be closed before the media cover 30 can be closed.

In some embodiments (for example, embodiments in which the portable printer is carried on a user's person), the printer defines a top surface 300, a front surface 305, and a bottom surface 310, shown in FIG. 1. The ribbon cover 20 and the media cover 30 may form at least part of the front surface 305. The ribbon cover 20 may include a slidable opening mechanism 320 (shown in FIG. 12) including the linkage 44, the cam surfaces 14, and/or biasing springs (not shown), and the media cover 30 may include a clamshell opening mechanism 325 including a media cover hinge 114 (shown in FIG. 3) and/or biasing springs (not shown). Alternatively, in some embodiments (not shown), the media cover 30 may include the slidable opening mechanism, and the ribbon cover 20 may include the clamshell opening mechanism.

A first button, such as the media cover button 35, may be used to trigger the clamshell opening mechanism 325, and a second button, such as the ribbon cover button 25 may be used to trigger the slidable opening mechanism 320. Due to the orientation of the portable printer 10 on the user's person, the slidable opening mechanism 320 may be spring biased upwardly along a slide direction A (shown in FIG. 4) generally away from the bottom surface 310 of the printer. Similarly, the clamshell opening mechanism 25 may be structured to pivot downwardly (arrow B in FIG. 4) generally away from the top surface 300. For example, the force of gravity may act on the media cover 35, in the case of the media cover 30 including the clamshell opening mechanism 325, such that when actuation of the media cover button 35 releases the media cover 30 from the printer housing, gravity assists the media cover 30 in pivoting about the media cover hinge 114 away from the top surface 300 of the printer 10, to the opened media position. In addition, a spring may be provided to facilitate or drive the media cover 30 to the opened media position. In contrast, in such embodiments, the slidable opening mechanism is biased (e.g., spring-biased, etc.) to move upwardly against the force of gravity.

In the depicted embodiment, the media cover button is located generally proximate the ribbon cover button. For example, as shown in FIG. 3, the media cover button 35 and the ribbon cover button 25 may be located on the same side of the printer in order to facilitate one-handed opening of both covers. In this way, a user may be able to open the media cover and/or the ribbon cover, replace the media supply and/or the ribbon supply, and close the media cover and/or the ribbon cover using only one hand.

Ribbon Cartridge Locating Features

In addition to the features described above, the printer 10 may be configured to receive and position a ribbon cartridge 52 for printing operations via locating features of the printer housing 12. As described below, the locating features of the printer housing 12 are configured to engage corresponding features on the ribbon cartridge 52 such that the cartridge 52 may be properly received in the ribbon receiving area 50 to produce correct ribbon path alignment for printing without requiring the cartridge 52 to have precise design tolerances. In this way, the ribbon cartridge 52 may include a frame 352 that is manufactured using a grade of plastic or other material that is semi-flexible and may thus be less expensive than more rigid types of plastic. Such lower grade plastics (which are typically less rigid and less expensive than higher grade plastics) may include polystyrene (PS) and acrylonitrile butadiene styrene (ABS). In contrast, higher grade plastics may include polycarbonate (PC) and PolyEtherEtherKetone (PEEK). An exemplary embodiment may use a ribbon cartridge 52 made of ABS. Use of a semi-flexible material such as ABS may allow the cartridge 52 to flex into alignment as it is installed in the ribbon receiving area 50, in which case the locating features may hold the ribbon cartridge 52 in place once installed to prevent unwanted flexing during printing, which could result in misalignment of the ribbon path.

Figure 13:
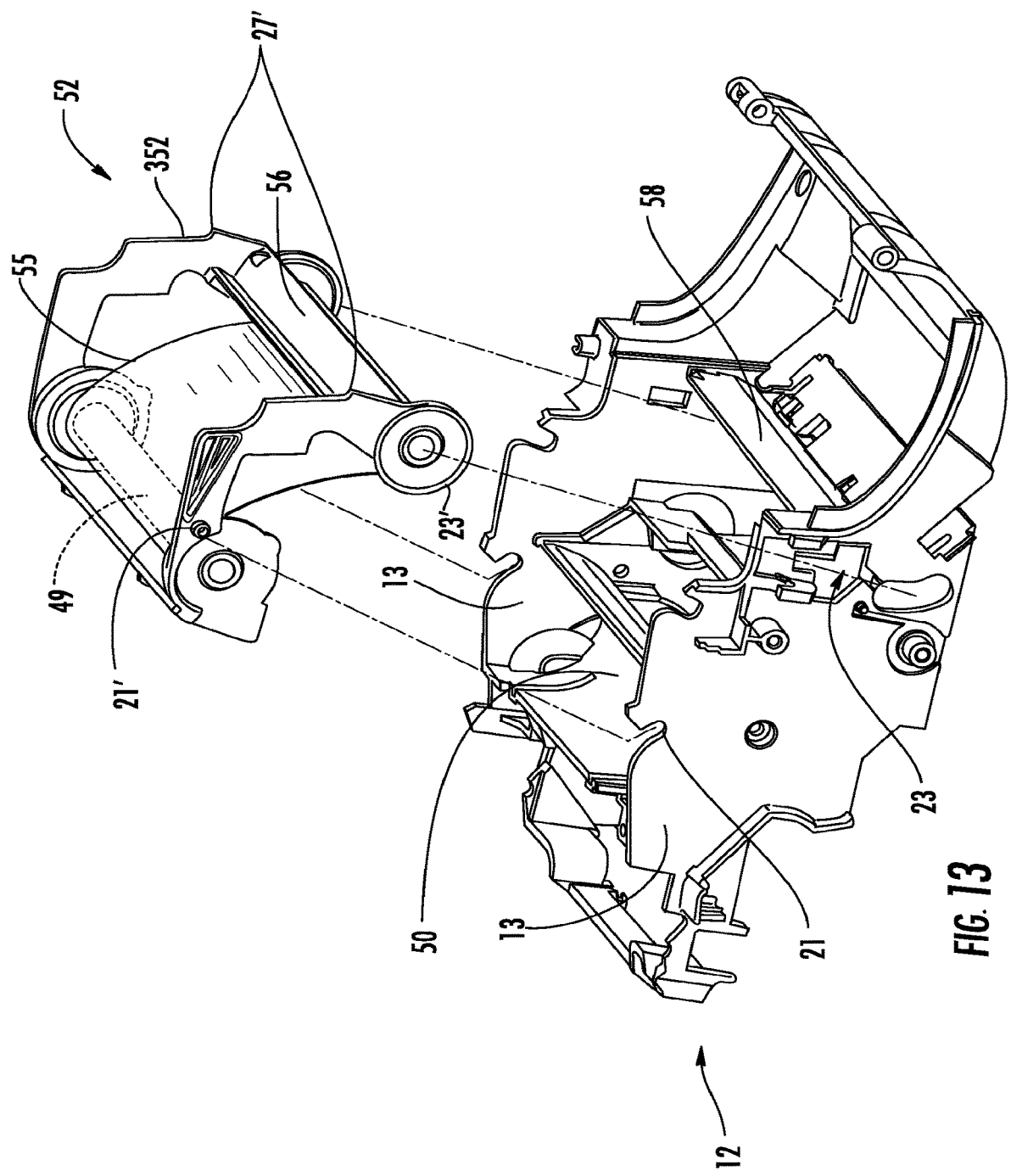
FIG. 13 illustrates a partial view of a printer housing, with a ribbon cartridge removed from the printer housing, according to an exemplary embodiment.
Figure 14:
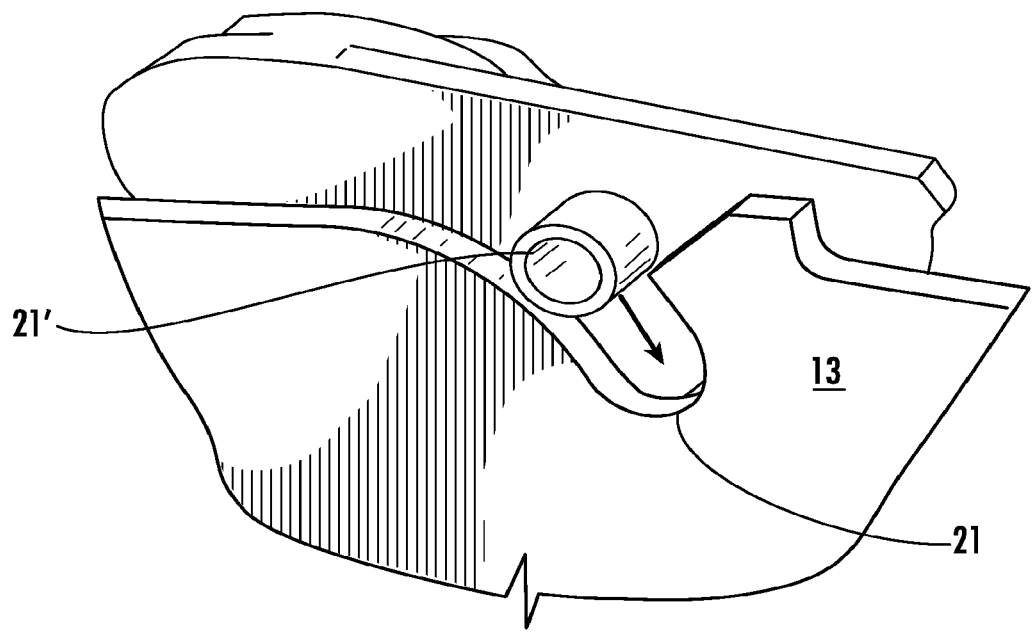
FIG. 14 shows a portion of the printer housing of FIG. 13 with a first locating feature and a portion of the ribbon cartridge having a first corresponding locating feature.
Figure 15:
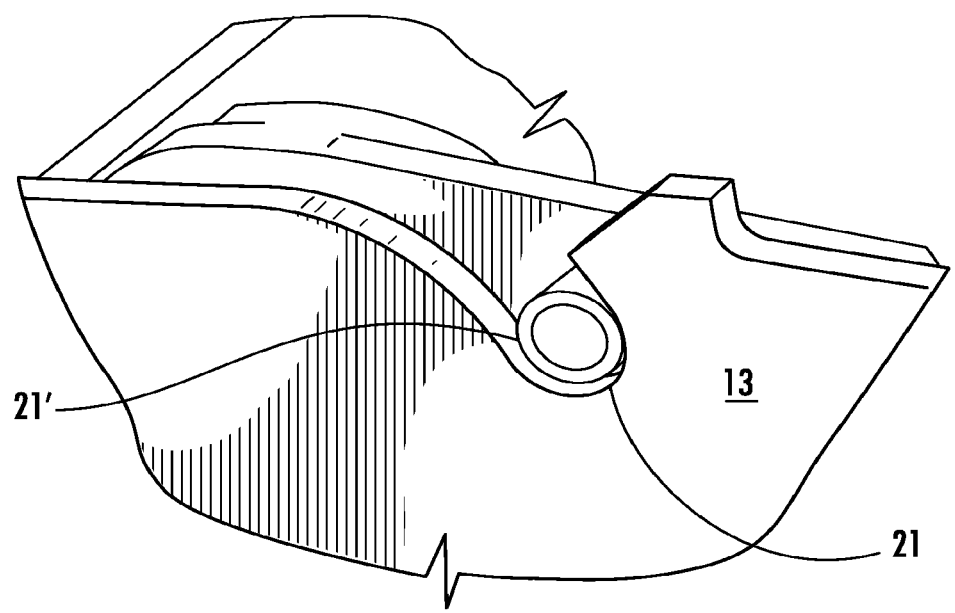
FIG. 15 shows the first locating feature of FIG. 14 of the printer housing engaged with the first corresponding locating feature of the ribbon cartridge.

With reference to FIG. 13, various surfaces and edges of the printer housing 12 and printer components may include locating features 21, 23, 27 that are configured to engage corresponding features 21', 23', 27' on the ribbon cartridge 52 to hold the ribbon cartridge in place during operation and maintain proper ribbon alignment. For example, the printer housing 12 may include a first locating feature 21 defined by two opposing inner walls 13 of the printer housing 12, as shown in FIG. 13. The first locating feature 21 of FIG. 13 is a parabolic groove cut out of each wall 13 that is sized and shaped to receive a first corresponding feature of the ribbon cartridge frame 352 (which, in this case, is a circular protrusion 21'). The first locating feature 21 of the printer housing may be cut at an angle, as shown, such that when the ribbon cartridge is first inserted into the ribbon receiving area 50, the protrusion 21' rests on the edge of the outer wall 13 proximate the first locating feature 21 but not in the trough of first locating feature 21, as shown in FIG. 14. When the ribbon cover 20 is subsequently moved from the opened ribbon position to the closed ribbon position and the supply spool 56 of the ribbon cartridge 52 is lowered into the ribbon receiving area 20 via movement of the ribbon cartridge retaining feature 58 (see FIGS. 11 and 12 and the corresponding description above), the protrusion 21' is moved into engagement with the trough of the first locating feature 21, as shown in FIG. 14. Once engaged, the protrusion 21' is surrounded on three sides by the wall 13, thereby restricting movement of the ribbon cartridge 52, as shown in FIG. 15.

Referring again to FIG. 13, a second locating feature 23 may be located on the inner surface of the printer frame 12. The second locating feature 23 may, for example, be on a portion of the inner surface of the printer frame 12 opposite the ribbon cartridge retaining feature 58 and adjacent the supply spool 56 when the supply spool 56 is installed. In this way, the second locating feature 23 may be positioned to engage a second corresponding feature of the ribbon cartridge 52 when the cartridge 52 is installed and the ribbon cover 20 is closed. Referring to FIG. 16, for example, the corresponding feature may be a tab 23' on the ribbon cartridge frame 352 proximate the supply spool 56. Thus, as the ribbon cartridge 52 is lowered into the ribbon receiving area 50 via the ribbon cartridge retaining feature 58 (i.e., as the ribbon cover is closed), the tab 23' may come to rest against the inner surface of the printer frame 12 in the area of the second locating feature 23.

Figure 17:
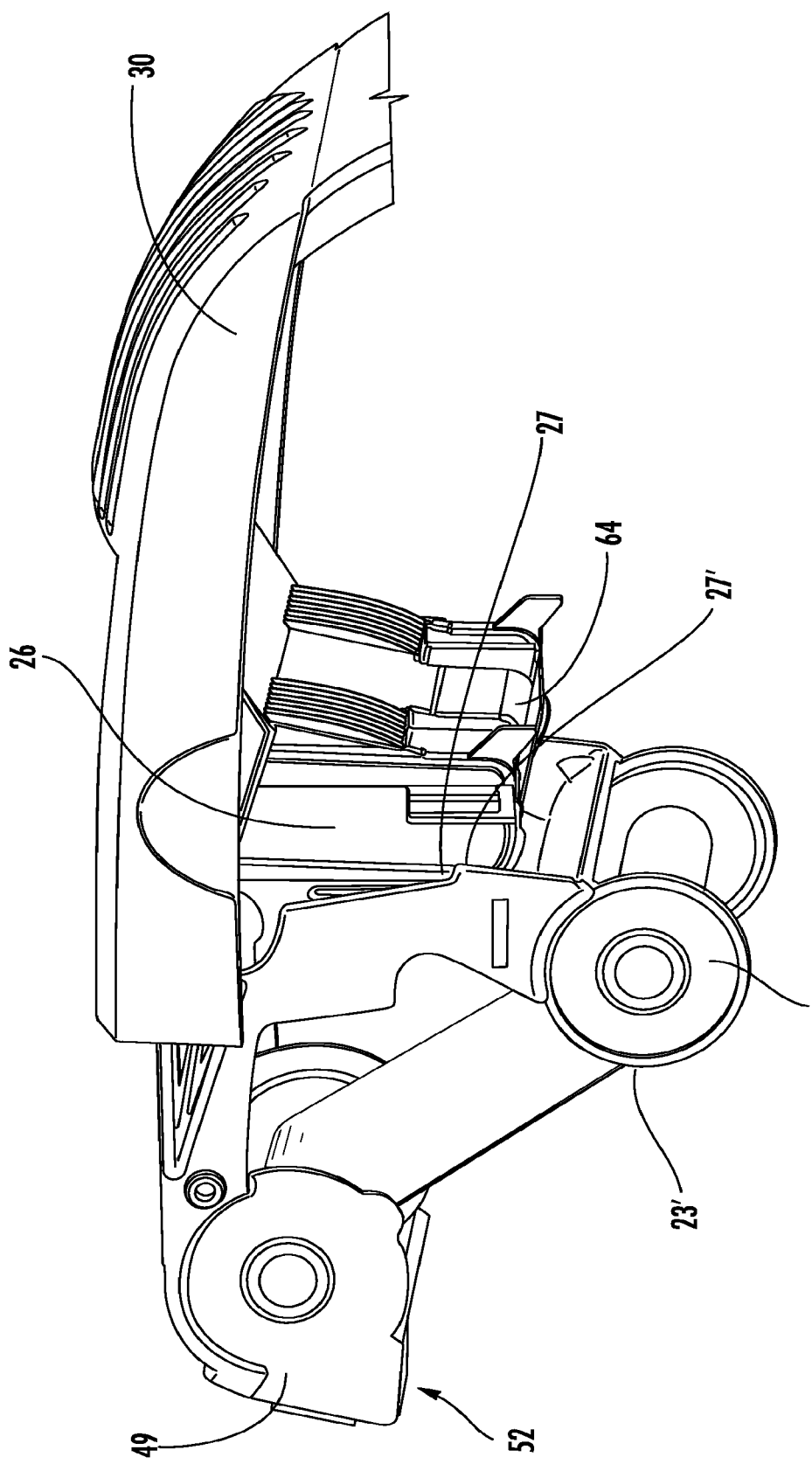
FIG. 17 shows the media cover of the printer of FIG. 1 engaged with a ribbon cartridge according to an exemplary embodiment.

A third locating feature may be a fin 27 located in the media cover 30 that is integrally molded or otherwise attached to an inside surface of the media cover 30, as shown in FIG. 17. For example, a shield housing 64 of the media cover 30 (discussed below) may define the fin 27 on each end wall 26. The location of the fin 27 may be such that when the ribbon cartridge 52 is installed and lowered into the ribbon receiving area 50 and the media cover 30 is closed, the fin 27 engages the third corresponding feature, which may be a notch 27' defined by the ribbon cartridge frame 352, thereby restricting the ribbon cartridge 52 from moving toward the media cover 30.

Figure 18:
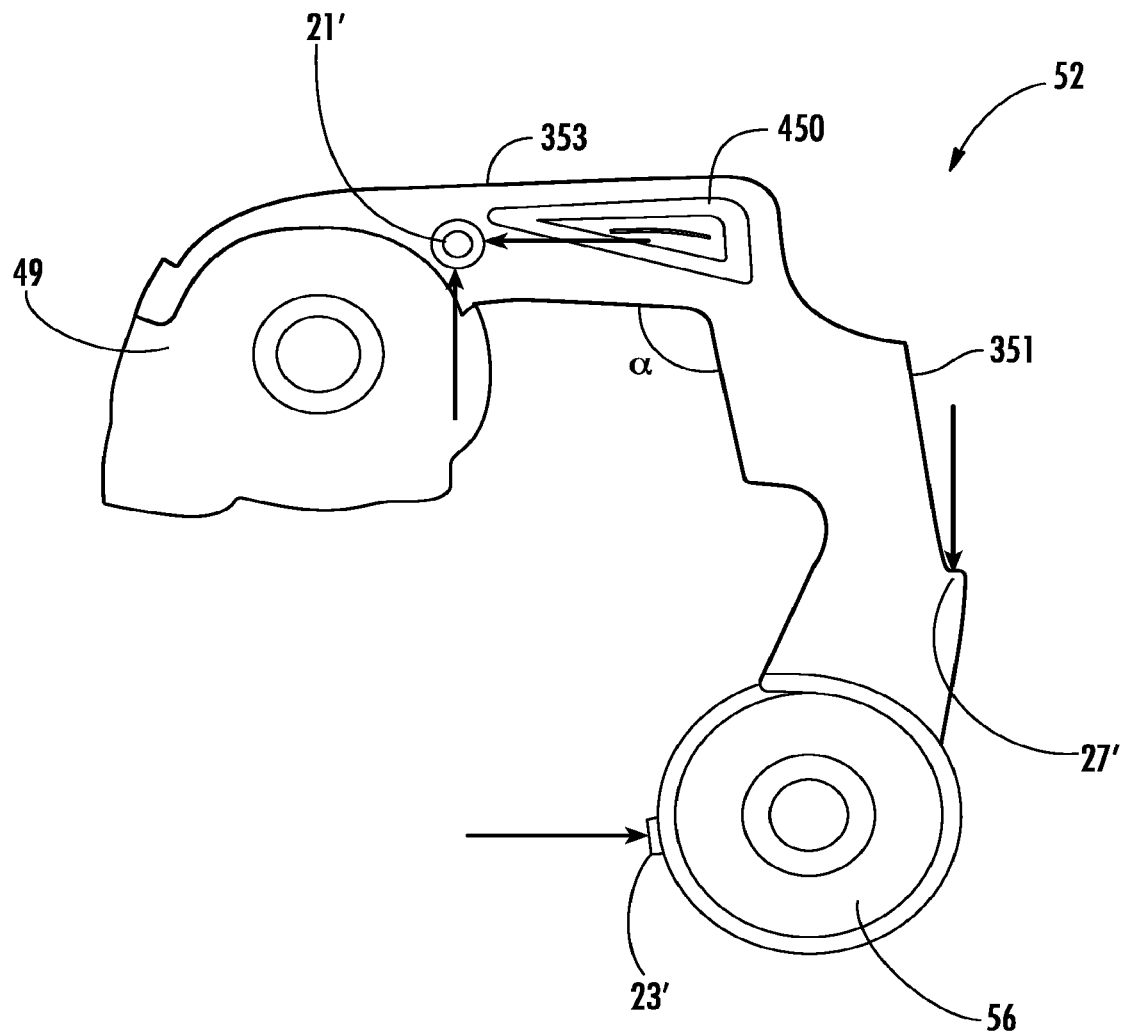
FIG. 18 is a side view of the ribbon cartridge of FIGS. 13-17 showing the forces exerted by the locating features of the printer.

The combination of the three locating features 21, 23, 27 described above can thus maintain the ribbon cartridge 52 in position during printing operations by resisting lateral and rotation forces that may be applied to the cartridge during printing. FIG. 18 shows the reactive forces that may be applied by the corresponding features 21', 23', 27' to stabilize the ribbon cartridge 52 and maintain proper alignment of the ribbon path.

As mentioned above and shown in FIG. 18, the ribbon cartridge 52 may include a supply spool 56, a take-up spool 49, and a ribbon cartridge frame 352. The ribbon cartridge frame 352 may include a first portion 351 structured to support the supply spool 56 and a second portion 353 structured to support the take-up spool. A retrieval assist angle α may be defined between the first portion 351 and the second portion 353. In addition, one or more gripping portions 450 may be defined proximate the retrieval assist angle α to facilitate grasping of the ribbon cartridge. Thus, the gripping portions 450 may assist a user in handling the ribbon cartridge 52 when retrieving the cartridge 52 from the ribbon receiving area 50 or inserting the cartridge 52 into the ribbon receiving area 50, as shown in FIGS. 16 and 18.

In this regard, the retrieval assist angle α may be any angle between 50° and 150°. For example, the retrieval assist angle α may be in the range of 90°-120°. The ribbon cartridge 352 may be adapted to be received in a printer, as described above, such that the gripping portions 450 are exposed for grasping by a user when the ribbon cartridge is disposed in the accessible portion and not exposed for grasping by the user when the ribbon cartridge is disposed in the installed position. Furthermore, the gripping portions 450 may include ridges or extended surfaces or points defined on the frame 352 that provide an area for the user to grasp the cartridge 52 when retrieving the cartridge from the ribbon receiving area 50. In this regard, the gripping portions 450 may be configured to sit above the rest of the cartridge 52 with respect to the plane of the front surface 305 of the printer when the ribbon cartridge retaining feature 58 is in the retrieval position.

Referring to FIGS. 5 and 16, the printhead support 410 may define a top surface 471, and the gripping portions 450 may be disposed below the top surface 471 when the ribbon cartridge 52 is in the installed position. Similarly, the gripping portions 450 may be disposed above the top surface 471 of the printhead support 410 when the ribbon cartridge 52 is in the accessible position. Thus, when the ribbon cartridge retaining feature 58 is lowered into the operational position, the gripping portions 450 may sink into the ribbon receiving area 50 such that the gripping portions 450 are no longer accessible and the ribbon cover door 20 may be closed. In addition, the gripping portions 450 may include a rough texture or other non-smooth surface to help the user grip the cartridge frame 352 when loading and unloading the printer.

In some embodiments, the take-up spool 49 may define an RFID tag configured to hold information regarding the ribbon cartridge. For example, the RFID tag may include information such as the type of ribbon cartridge, the manufacturer, and the date of manufacture that can be read by an RFID reader disposed on a corresponding portion of the printer housing (such as within the ribbon cartridge receiving area).

Ribbon Guiding Feature

Another feature that may be included to improve printing quality in a printer is a ribbon guiding feature. The ribbon guiding feature comprises a ribbon guide 72, shown in FIGS. 5 and 19, that is configured to contact and guide the ribbon 55 along the ribbon path as the ribbon 55 extends between the supply spool 56 and the printhead 70. As the ribbon 55 passes over the ribbon guide 72, the ribbon guide 72 is able to adjust and align itself with respect to the ribbon 55 such that the ribbon guide 72 can remain in contact with the width of the ribbon 55. In this way, the tension in the ribbon 55 may be generally equalized, reducing the incidence of wrinkles in the ribbon 55 and improving print quality without requiring the use of a highly precise guiding surface.

FIG. 5 shows a printing mechanism 400 in accordance with some embodiments of the invention. The printing mechanism 400 includes a printhead 70 defining a printing surface 470, a platen 75 configured to oppose the printing surface 470 during printing operations, a ribbon guide 72 configured to guide a portion of ribbon 55 over the printing surface 470 of the printhead 70, and a printhead support 410 defining a printhead receiving portion 415 and a ribbon guide receiving portion 185. The printhead receiving portion 415 is thus configured to attach to the printhead 70, and the ribbon receiving portion 185 is configured to attach to the ribbon guide 72, as described below. Furthermore, the platen 75 may be included in the media cover 30, such that when the media cover 30 is moved from the opened media position to the closed media position, the platen is moved into place to operationally engage the printhead 70 at the printing surface 470.

Figure 19:
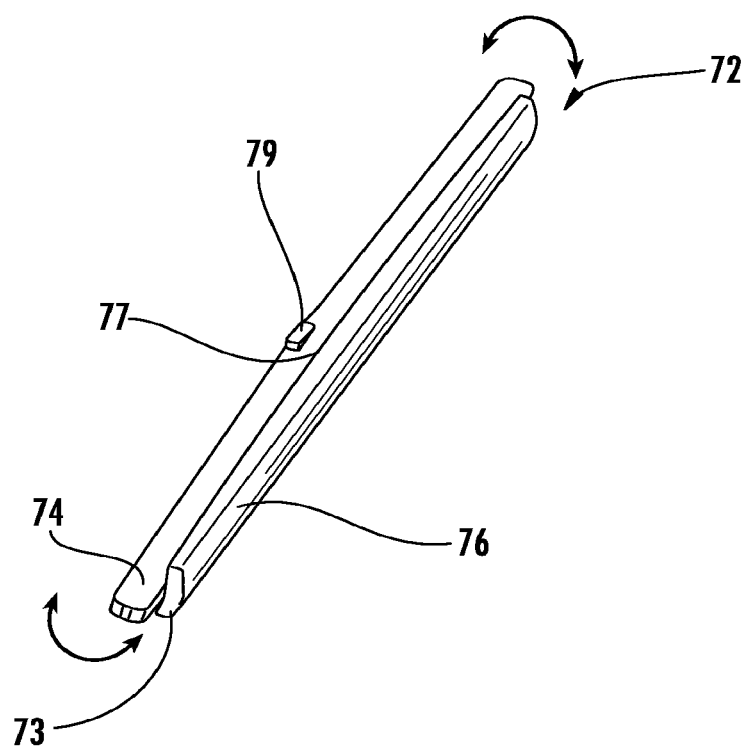
FIG. 19 shows a ribbon guide of a printer according to an exemplary embodiment.

Referring to FIG. 19, the ribbon guide 72 includes a guide portion 72 and an attachment portion 74. The guide portion 73 has a guide surface 76, across which the ribbon 55 travels as fresh ribbon is supplied by the supply spool 56 and consumed ribbon is taken up by the take-up spool 49 (shown in FIG. 5). The guide portion 73, as well as other parts of the ribbon guide 72, may be made of any material capable of providing a smooth surface that allows the ribbon 55 to be drawn across the guide surface 76 without being hindered, torn, or otherwise damaged. For example, the guide portion 73 may be made of an injection-molded plastic. In some cases, the guide portion 73 includes a carbon-fiber filling that promotes the dissipation of static electricity from the ribbon. Static electricity may be generated on the ribbon 55 due to the friction created as the ribbon 55 is pulled across the guide surface 76. Static may also be generated as a result of unrolling the ribbon 55 from the supply spool 56. If left undissipated, the static electricity may build to a level that can damage the thermal printhead 70 or other electronics downstream, disrupt the normal operations of the electronic systems, or at least impair the quality of the printing operation.

Figure 20:
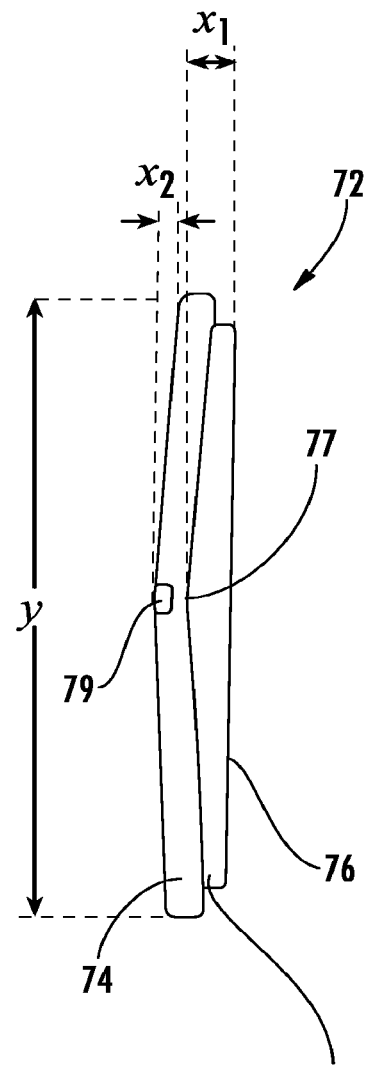
FIG. 20 shows the top view of the ribbon guide of FIG. 19.

Referring again to FIG. 19, the guide portion 73 is affixed to the attachment portion 74 and is substantially perpendicular to the attachment portion 74. For example, the guide portion 72 and the attachment portion 74 may form a "T" shape when viewed in cross-section, as shown in FIG. 5. The guide portion 73 and the attachment portion 74 may be joined to each other using an adhesive, or the two portions 73, 74 may be integrally molded to form a unitary ribbon guide 72. In any case, the guide portion 73 is configured such that the width $x_1$ of the guide portion 73 increases from each end of the guide portion 73 to the center area of the guide portion 73 (i.e., along the y-axis), as illustrated in FIG. 20, creating a ribbon guide pivot point 77 on the guide portion 73 at the area of increased width, as described below. Similarly, the attachment portion 74 may be configured such that the edge of the attachment portion 74 farthest from the guide portion 73 may be bowed out in the center area, corresponding to the area of increased width of the guide portion 73. Thus, the width of the ribbon guide 72 proximate each end of the ribbon guide is less than the width proximate a central portion of the ribbon guide. In this way, additional clearance $x_2$ may be provided at the ends of the attachment portion 74 to allow the ribbon guide 72 to pivot once installed, as described below.

With reference to FIG. 5, the attachment portion 74 is configured to be mounted to the printer housing 12 via the ribbon guide receiving portion 185 of the printhead support 410 (which is described in conjunction with the RFID coupler mounting feature below). The printhead support 410 may be, for example, one or more aluminum extrusions and may include a bracket portion 78 configured to receive the attachment portion 74 of the ribbon guide 72. For example, the bracket portion 78 may have a "C" shape in cross-section, as shown in FIG. 5. The ends of the "C" may be separated by a distance that corresponds to the thickness of the attachment portion 74 such that the attachment portion 74 may fit within and be supported by the bracket portion 78.

In this regard, the attachment portion 74 may include a guide tab 79, depicted in FIGS. 19 and 20, located on the edge of the attachment portion 74 farthest from the guide portion 73 and proximate the ribbon guide pivot point 77 in the central portion of the ribbon guide. The guide tab 79 may be configured to maintain the attachment portion 74 in engagement with the bracket portion 78 of the ribbon guide receiving portion 185 while at the same time allowing the ribbon guide 72 to pivot about the ribbon guide pivot point 77 in the direction of the arrows shown in FIG. 19.

Once in place within the bracket portion 78 shown in FIG. 5, the shape of the guide portion 73 and corresponding shape of the attachment portion 74 allow the ribbon guide 72 to pivot about the ribbon guide pivot point 77 (shown in FIG. 20). This is because the edge of the guide portion 73 proximate the ribbon guide pivot point 77 maintains contact with the outer surface 81 of the bracket portion 78 while the edge of the guide portion 73 at each end of the guide portion 73 is free to move with respect to the outer surface 81 of the bracket portion 78. The corresponding shape of the attachment portion 74 provides clearance at the ends of the attachment portion 74 to move within the bracket portion 78 in response to the pivoting.

Referring to FIG. 5, the ribbon guide 72 is supported by the ribbon guide receiving portion 185 in a position along the path of the ribbon 55 between the supply spool 56 and the thermal printhead 70. As the ribbon 55 is unwound from the supply spool 56 and moves towards the take-up spool 49, part of the ribbon 55 may experience more tension than the rest of the ribbon 55. For example, one edge of the ribbon 55 may be stretched more tautly between the supply spool 56 and the thermal printhead 70/platen roller 75, leaving the opposite edge of the ribbon 55 to hang more loosely. As a result, the ribbon guide 72 in this case pivots about the ribbon guide pivot point 77 in the direction of increased tension. In other words, the increased tension in the ribbon 55 moves the guide portion 73 towards the bracket portion 78 of the ribbon guide receiving portion 185 in the high-tension area while the opposite end of the guide portion 73 is moved away from the bracket portion 78. Some of the tension in the high-tension area of the ribbon 55 is thereby be relieved, and a corresponding portion of the tension in the other areas of the ribbon 55 is increased proportionally while maintaining contact of the guide surface 76 with the ribbon 55 across the width of the ribbon. In this way, the tension across the width of the ribbon 55 may be continually equalized during printing without interrupting the printing operation.

RFID Coupler Mounting Feature

Another feature that may be included in a printer 10 according to an exemplary embodiment is an RFID coupler mounting feature. FIG. 5 shows that this feature allows an RFID coupler 60 to be mounted in a printer 10 for reading, encoding, or otherwise communicating with RFID tags.

The RFID coupler mounting feature may be useful for quickly encoding and reading data for product labels. For example, this feature may help with printing needs on or near an assembly line, in distribution centers or warehouses where on-demand RFID encoding and reading is required, and in a variety of other applications. Although this feature is disclosed here in a specific embodiment for use within a portable thermal transfer printer 10, it may also be used with any type of RFID encoding or reading device or other types of printers using other printing technologies.

The RFID coupler mounting feature provides for a relatively small and compact configuration for the combination of the RFID coupler and the printhead. Typically, in conventional printers, when combining an RFID coupler with a printhead for use in one printer, a greater distance is necessary to achieve proper printing results. Moreover, conventional combination printers often require the printer to back-up or stop and read or encode the RFID tag, and then proceed forward to print with the printhead 70. This system, however, allows for near continuous motion of the media 45 and even smaller media label sizes since the RFID coupler 60 and printhead 70 are placed so close together.

Due to the close proximity of the RFID coupler 60 to the media 45, however, the energy radiated by the RFID coupler 60 may engage multiple media 45 or, more specifically, multiple RFID tags associated with the media 45. In this regard, the RFID coupler mounting feature may include one or more shielding elements to prevent or reduce the likelihood of multiple activations of RFID tags at the same time.

Figure 21:
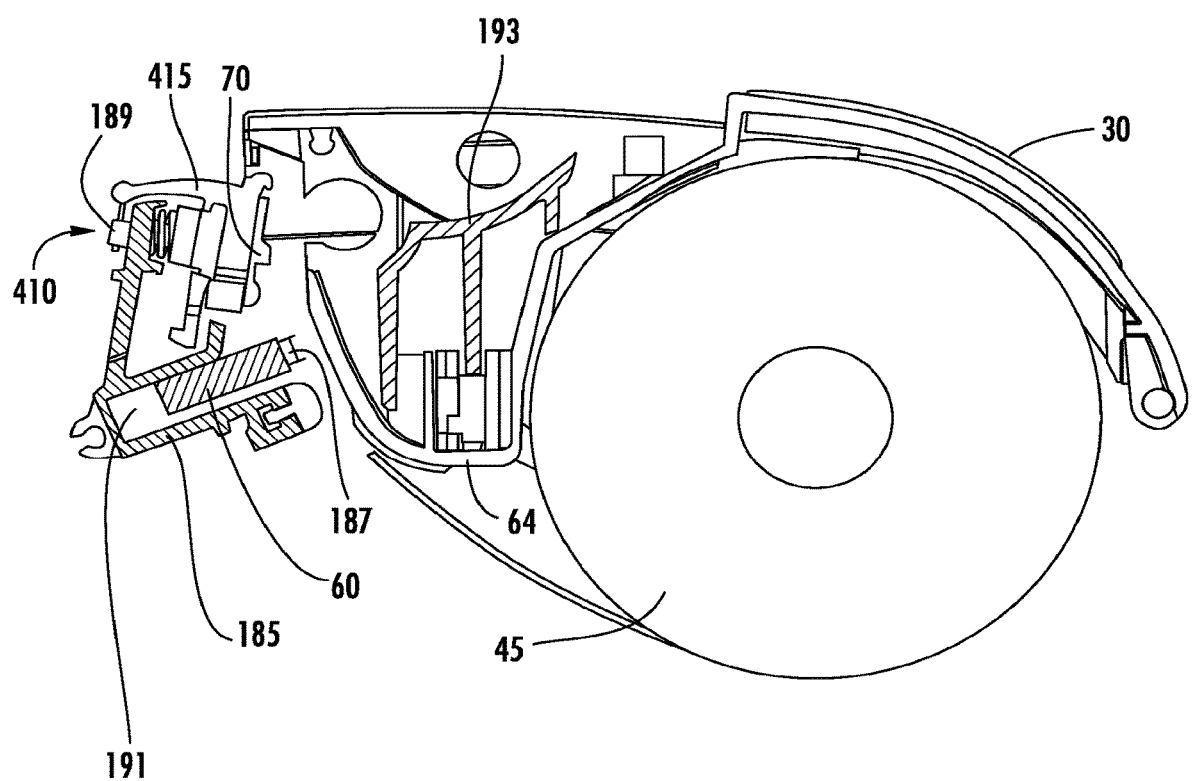
FIG. 21 is a cross-sectional representation of the printer of FIG. 1, showing shielding of an RFID coupler during printing, according to an exemplary embodiment.

FIG. 21 illustrates an exemplary embodiment of this mounting feature. More specifically, the printer includes a printhead support 410, described above, for securing the RFID coupler 60 within the printer or relative to the printhead. The printhead support 410 may be one piece, or, according to the exemplary embodiment shown in FIG. 5, may include a printhead receiving portion 415 that is formed separately and is fastened to the rest of the printhead support 410, as shown. For example, the printhead support 410 may be connected to the printhead 70 with a printhead screw 189 or other fastener. At least part of the printhead support 410, such as the ribbon guide receiving portion 185, may be an aluminum extrusion element that functions as a mounting point for the coupler and as an electromagnetic shield. With regard to the shield function, the printhead support 410 may define a cavity or pocket 191 with one open end disposed proximate the printhead 70 such that at least part of the printhead support 410 shields the coupler in all directions other than the open end which faces a particular media 45 or, more specifically, the RFID tag associated with the particular media, that the coupler is intended to read or encode. Thus, the printhead support 410 maintains proper shielding while allowing for the printhead 70 and RFID coupler 60 to be placed in close proximity to each other. Moreover, as seen in FIG. 5, the printhead support 410 may be shaped to correspond with the ribbon cartridge 52 and platen roller 75 to allow the ribbon 55 to pass over the printhead 70 for effective thermal transfer printing.

As can be seen from FIGS. 4 and 12, the printhead support 410 may be configured such that, when received in a printer housing, a first end 480 and a second end 481 of the printhead 70 define channels 490 on opposite sides of the printhead 70 (e.g., between the respective end and the printer housing) that are configured to receive at least a portion of the ribbon cartridge frame 352 installed in the ribbon receiving area 50. Thus, when installed, the printhead 70 is positioned between the supply spool 56 and the take-up spool 49 of the ribbon cartridge 52, as illustrated in FIG. 5. When the ribbon cartridge retaining feature 58 is moved from retrieval position (FIG. 12) to the operational position (FIG. 11), the ribbon cartridge frame 352 is thus further received by the channels 490 at each end 480, 481 of the printhead 70, thereby allowing the ribbon cover 20 to close. The "peninsular" orientation of the printing mechanism 400 within the printer therefore allows a more compact configuration of the printing mechanism 400, ribbon cartridge 52, and printer housing, providing for a smaller and more efficiently design portable printer 10.

As previously stated, according to the illustrated embodiment, the printhead support 410 may be an aluminum extrusion element. However, in other embodiments, the printhead support 410 may be made of any conductive material or combination of conductive materials, such as copper, aluminum, or the like. Moreover, in other embodiments, the printhead support 410 may be manufactured through a method other than an extrusion method. For example, the printhead support 410 may be made through a deep drawing method, a casting method, or other manufacturing method or combination thereof. Furthermore, at least part of the printhead support 410, such as the printhead receiving portion 415, may act as a heat sink to dissipate heat generated by the printhead 70 during printing operations.

Referring back to FIG. 21, in instances such as the illustrated embodiment, in which providing shielding of the coupler is desirable, the printer may further include a separate (i.e., not part of the printhead support 410) electromagnetic shield 193 to further block energy radiated by the RFID coupler 60. According to the illustrated embodiment, the media cover 30 of the printer 10 may include an electromagnetic shield. For example, the media cover 30 may define a protrusion, termed the shield housing 64, that stores the electromagnetic shield 193. When the media cover 30 is closed, the electromagnetic shield 193 blocks the stored media 45 from being read or encoded by the RFID coupler 60. The electromagnetic shield 193 can be made of any conductive material, such as aluminum. As shown, when the media cover 30 is closed, the shield housing 64 is strategically positioned between the RFID coupler 60 and the roll of media 45. Since each media has an associated RFID tag, the roll of media 45 is also a roll of RFID tags which may be at risk of unintentional activation but for the shield housing 64 being positioned between the roll of RFID tags and the RFID coupler 60.

In addition to shielding, the range of the radiated energy from the RFID coupler 60 may be controlled, so that only the desired RFID tag is read or encoded. A short range RFID coupler 60 reduces the chance that additional RFID tags will be engaged when in typical operation. In such embodiments, printhead support 410 may be configured to mount the coupler but not specifically configured for shielding. For example, the printhead support 410 may define a frame-like element that is configured to hold the RFID coupler but not necessarily to provide shielding for each side of the RFID coupler except one.

Thus, the printhead support 410, electromagnetic shield 193, and the RFID coupler 60 combine to create an environment where the RFID coupler 60 reads or encodes the desired RFID tag and minimizes the likelihood of unintentional activation of multiple RFID tags at the same time. In some embodiments, the RFID coupler 60 may be further configured to have a limited range for reading and/or encoding, as described in U.S. Patent Publication No. 2007-0262873 entitled "RFID UHF Stripline Antenna-Coupler," which is hereby incorporated by reference in its entirety.

Figure 22:
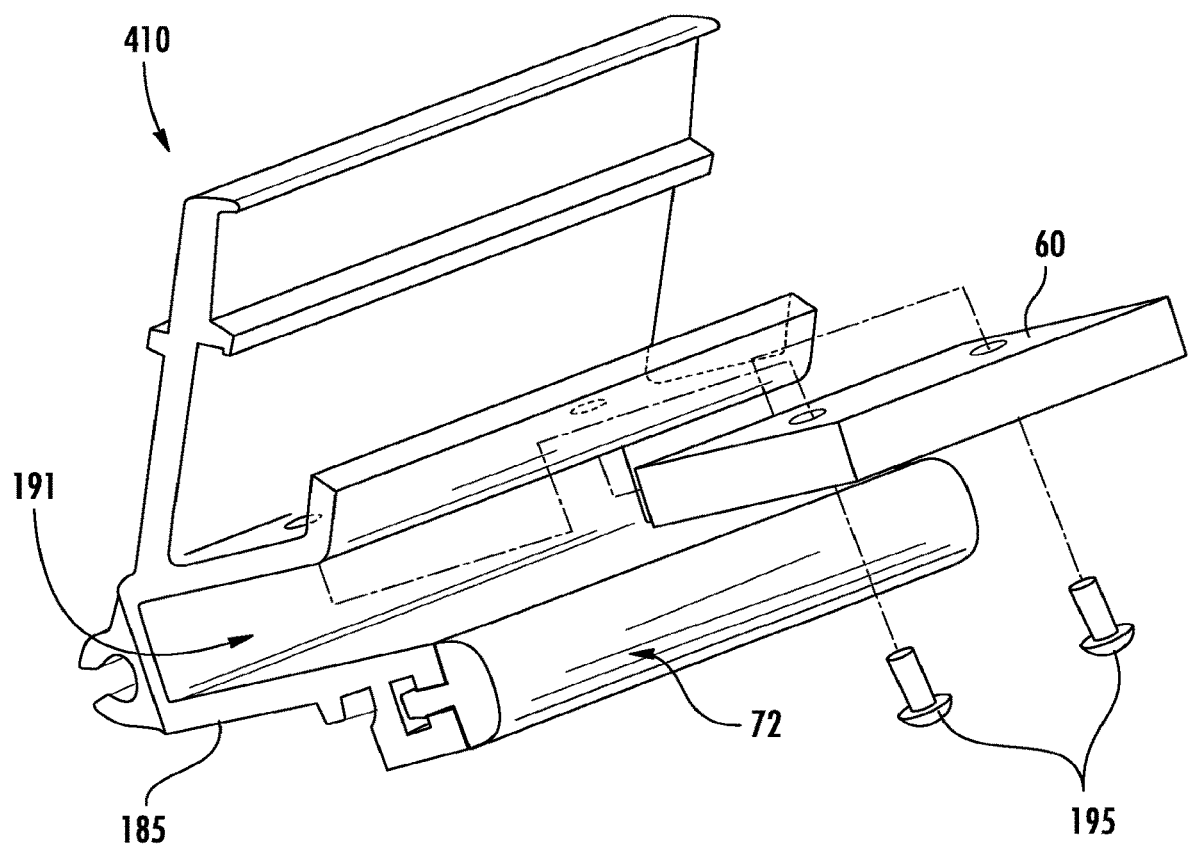
FIG. 22 illustrates the mounting of the RFID coupler of FIG. 21 in the printer according to an exemplary embodiment.

FIG. 22 illustrates the RFID coupler 60 being mounted inside the pocket 191 of the printhead support 410. As an example and as illustrated, the RFID coupler 60 may be connected directly to the printhead support 410 with two coupler screws 195. The RFID coupler 60 may be connected with the smaller end 187 facing the media 45 for encoding or reading. This mounting enables the RFID coupler 60 to be shielded by the printhead support 410 while still maintaining close proximity to the printhead 70.

Media Guide Locking Feature

Another feature that may be included in the printer according to an embodiment is a media guide locking feature. The locking feature may be configured to secure the media 45 when the media cover 30 is in the closed media position, stopping or hindering the media 45 from shifting when the printer 10 is moved.

Figure 23:
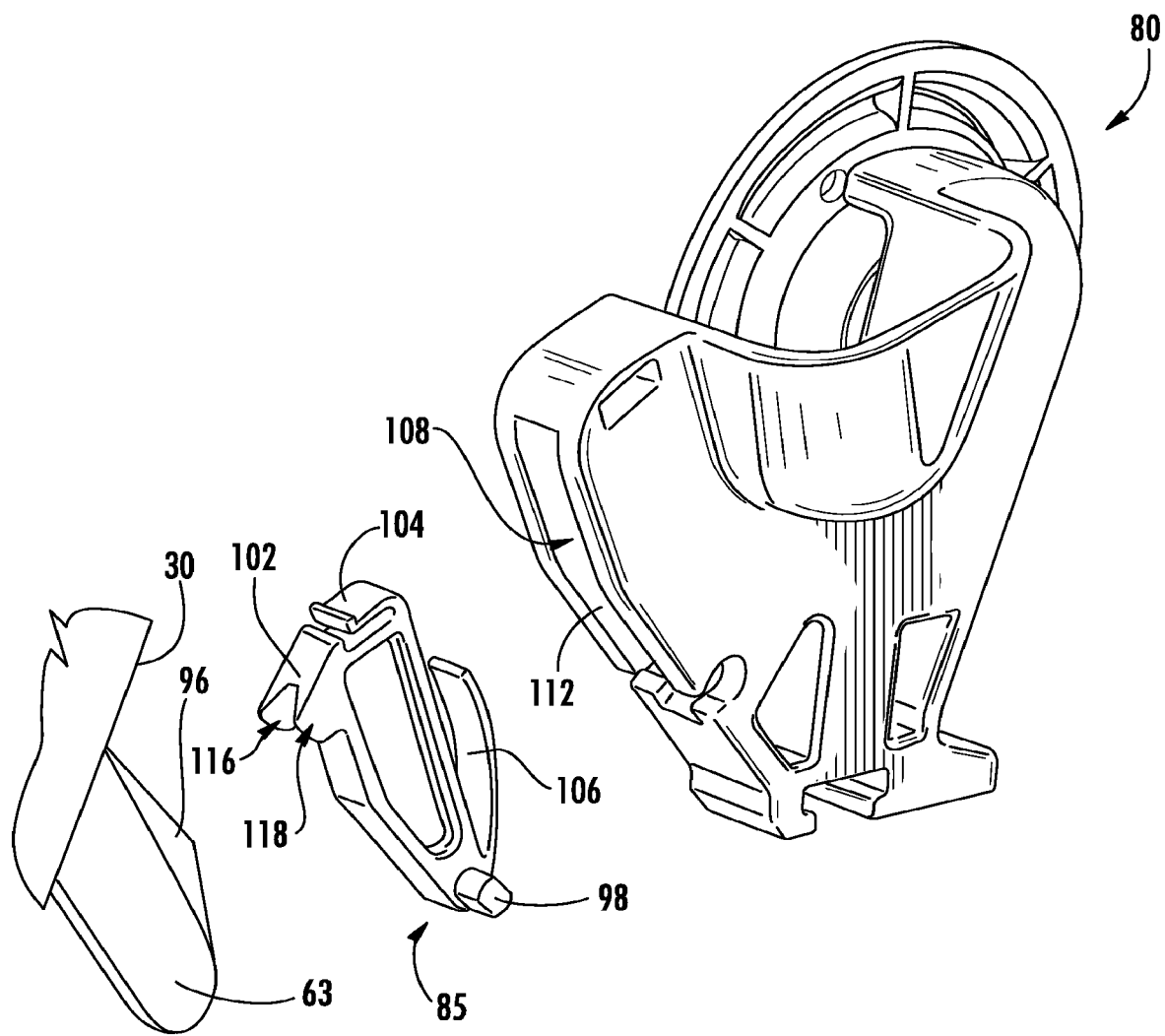
FIG. 23 illustrates a locking element connecting to both a media support arm and the media cover according to an exemplary embodiment.
Figure 24:
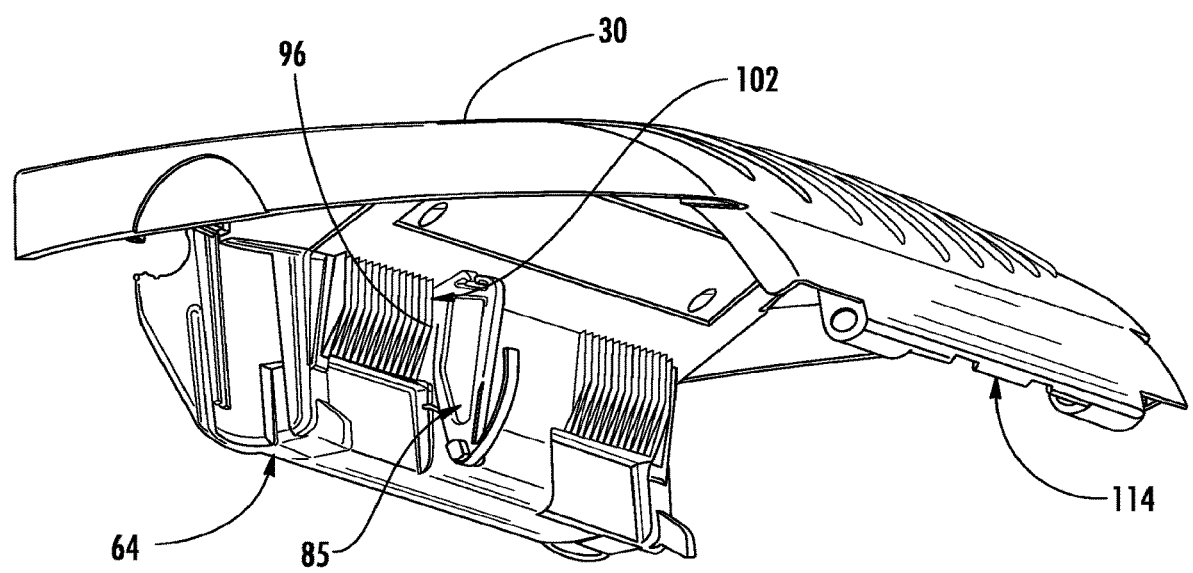
FIG. 24 shows the locking element of FIG. 23 connected to the media cover.

FIG. 23 shows an example of the locking system, which is comprised of three main parts: at least one media support arm 80; a first locking element 85 of the media support arm 80; and at least one second locking element on the media cover, such as a media cover rib 96. The locking system utilizes a first locking element 85 located in each support arm 80 to engage with media cover ribs 96 attached to the media cover 30. This system engages once the media cover 30 is closed and locks the media 45 in a position, as shown in FIG. 24. When the media cover 30 is opened, the system disengages allowing the media 45 to move easily for loading purposes.

Such a locking system provides several benefits. For example, coreless media has been recognized by the inventors as presenting unique challenges when the media is consumed to a point at which the "core" (i.e., the portion of media at the center of the supply) is almost exhausted and can no longer act as a stable "core" due to the lack of rigidity inherent in the media itself. In other words, the media 45 is adapted to transition from a laterally strong condition (e.g., when the roll is full) to a laterally weak condition (e.g., when the roll is nearly empty). By providing the locking system described below, however, coreless media can be stabilized via the locking system throughout the life of the media (i.e., from the time a full roll of media is installed until the media is consumed). Thus, the media can continue to be used for printing operations without negatively impacting the quality of printing as the media supply approaches empty, allowing for more efficient use of resources.

Figure 25:
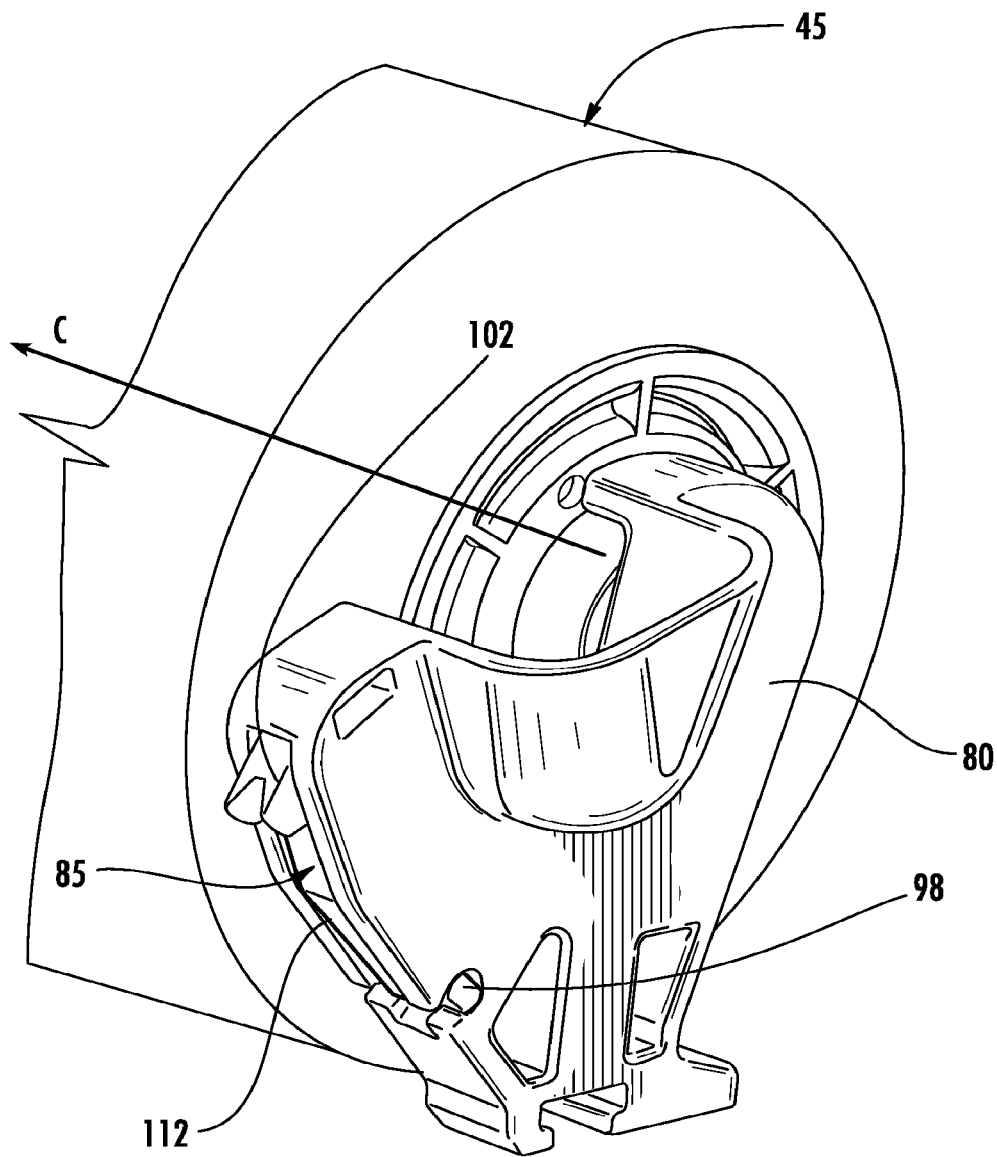
FIG. 25 shows the media support arms of FIG. 23 engaged with a supply of media.

According to the illustrated embodiment, at least one of the media support arms 80 is biased to slidably translate along the housing to provide a holding force C to opposite sides of the media 45 (shown in FIG. 25). At least one of the media support arms 80 may define a first locking element 85, which may include a locking element pivot point 98, a locking element tab 102, a locking element snap 104 and a locking element spring 106. FIG. 23 shows how the first locking element 85 may be inserted into a support arm pocket 108 incorporated into the media support arm 80. The first locking element 85 is inserted into the support arm pocket 108 through an aperture 112 via the locking element snap 104, which holds the first locking element 85 within the pocket 108 and keeps the first locking element 85 from falling out of the pocket 108 once it has been inserted. In other words, as the first locking element 85 is being inserted, the locking element snap 104 is movable towards the body of the first locking element 85 to allow the first locking element 85 to clear the aperture 112 and be inserted into the pocket 108. Once the first locking element 85 (and, more specifically, the locking element snap 104) has cleared the aperture 112, the locking element snap 104 moves back to its original position and maintains the first locking element 85 within the pocket 108. A support arm 80 with the first locking element 85 in position within the pocket 108 is shown in FIG. 25.

Once inserted, features on the first locking element 85 operate in conjunction with the support arm pocket 108 to ensure that the locking element tab 102 is forced through the support arm aperture 112. In this regard, the locking element spring 106 pushes against the back of the media support pocket 108, shown in FIG. 23, causing the first locking element 85 to pivot about the locking element pivot point 98. This pivoting in turn causes the locking element tab 102 to be forced out the support arm aperture 112. The locking element snap 104 (shown in FIG. 23) can be located in a manner that creates a default position in which the first locking element 85 stays within the support element pocket 108 while allowing the locking element tab 102 to extend out the support arm aperture 112. As will be discussed in greater detail later, the locking element spring 106 and locking element pivot point 98 allow external forces to push the locking element tab 102 into the pocket 108 and also allow the first locking element 85 to return to the default position once the force is removed.

The second locking element, or, in this example, the media cover ribs 96, can attach to the shield housing 64 portion of the media cover 30. FIG. 24 shows that near the end opposite the media cover hinge 114, a portion of the media cover 30 making up the shield housing 64 extends away from the outer covering back into the media receiving area 40. (FIG. 24 illustrates a portion of the media cover 30 and a first locking element 85 without a media support arm 80 to better illustrate the interaction between the first locking element 85 and a media cover rib 96 of the media cover 30.) The media cover ribs 96 may be located on the shield housing 64 such that the media cover ribs 96 face towards the media and the media cover hinge 114. The media cover ribs 96 may in some cases span the width of the shield housing 64. In other cases, the middle portion of the shielding housing 64 may not include media cover ribs 96, such as in the example shown in FIG. 24.

The locking element tabs 102 engage with the media cover ribs 96 when the media cover 30 is in closed media position. The locking element tabs 102 are configured to fit around or otherwise engage the media cover ribs 96. For example, referring to FIG. 23, each locking element tab 102 may have a first protrusion 116 and a second protrusion 118 on either side of a groove. Once a media cover rib 96 is engaged with the locking element tab 102 groove, the media support arm 80 is fixed and the media 45 is locked in position. Although each locking element tab 102 independently may be sufficient to lock the media 45 in place, using a first locking element 85 in each media support arm 80 allows for redundancy.

The locking feature may also be configured to self-adjust. The pivoting feature in the first locking element 85 allows the media cover 30 to close easily regardless of the location of the first locking element 85. The pivoting feature will then adjust the first locking element 85 if necessary to engage the media cover ribs 96 while the media cover 30 is in the closed position. This self-adjust system can work as follows. If a media cover rib 96 lines up with the locking element tab 102 groove, then no adjustment is necessary because the media cover rib 96 slides into the groove unobstructed. Once the groove engages with the media cover rib 96, the media 45 is locked into place. If a media cover rib 96 is aligned so that it hits one of the protrusions 116 or 118 and not the groove, the locking element tab 102 pivots through the support arm aperture 112 into the media support arm pocket 108 allowing the media cover 30 to close unobstructed. The locking element spring 106 continues applying force pushing the locking element tab 102 towards the support arm aperture 112 out the media support arm pocket 108. This ensures that when the media 45 is shifted, the locking element tab 102 will spring out the support arm aperture 112 once the groove becomes aligned with a media cover rib 96. Once the locking element tab 102 groove is engaged with the media cover rib 96, the media 45 is locked in place. Sloping the media cover ribs 96 and locking element tab 102 grooves may allow the media cover ribs 96 to align with the locking element tabs 102 more often. Also, sloping the media cover ribs 96 and locking element tab 102 groove may allow the locking system to engage after less shifting of the media 45 if the locking element tab 102 groove is not aligned with a media cover rib 96 when the media cover 30 is closed.

The locking feature may also provide an additional function. When the system is engaged, the locking element spring 106 pushes against both the media cover ribs 96 and the back of the media support pocket 108. This forces the media support arms 80 away from shield housing 64, which helps to stabilize the media support arms 80 and increases the overall printing quality.

Media Alignment Feature

A media alignment feature may also be included in embodiments of the printer 10 in order to allow a user to properly align media with the printhead when installing the supply of media. The media alignment feature may be provided in various forms, including alignment marks, alignment ribs, and edge guides, each of which is described below.

Figure 26:
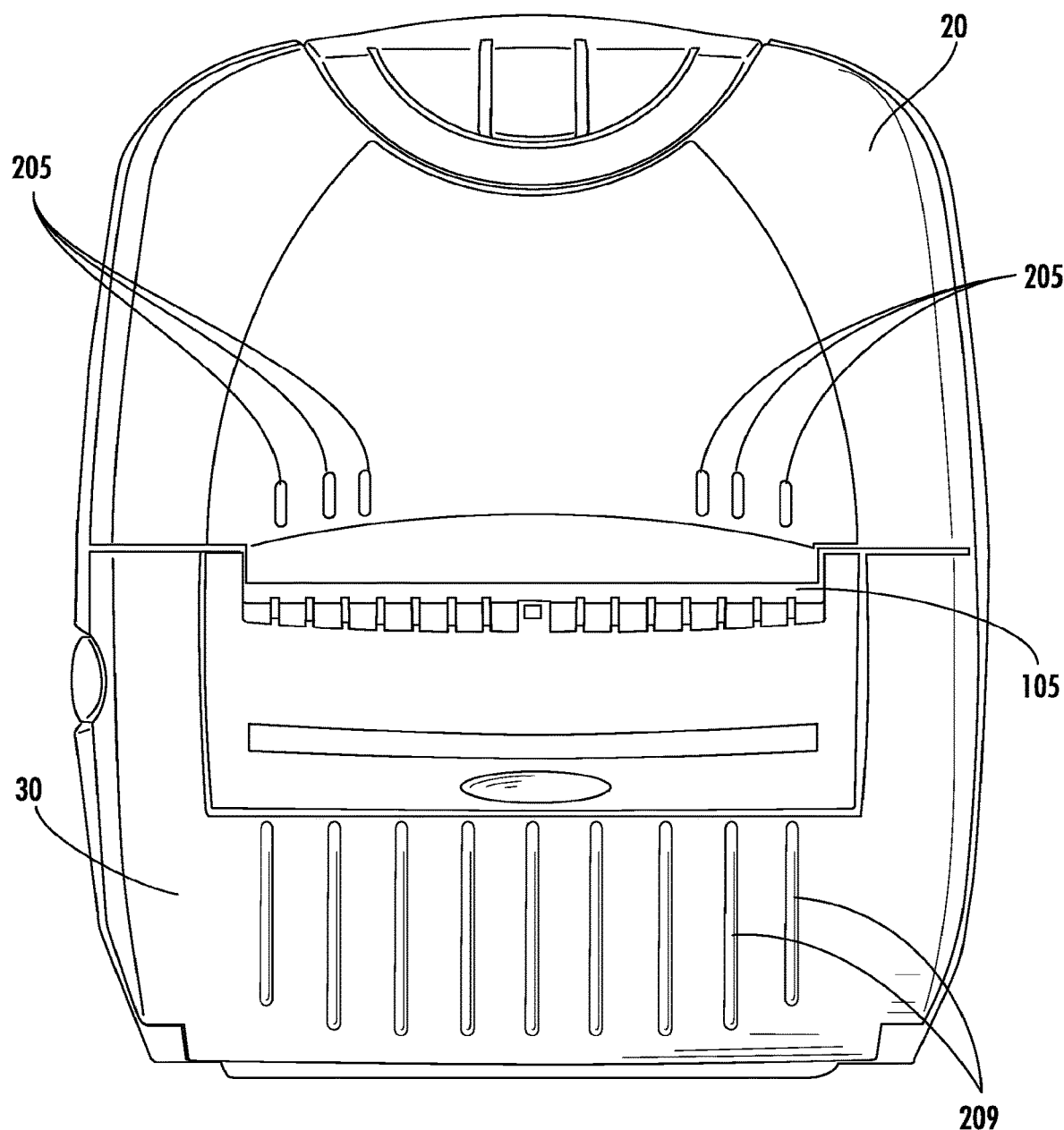
FIG. 26 is a top view of a printer including alignment marks according to one embodiment.

Referring to FIG. 26, the printer 10 in some embodiments may include alignment marks 205 on the outside surface of the ribbon cover 20 for aligning the edges of the media. In this regard, when the media 45 is inserted into the media receiving area 40 (see FIG. 3), the user can extend the leading end 207 of the media 45 (shown in FIG. 5) across the outside surface of the ribbon cover 20, with the media cover 30 still open, and adjust the alignment of the media 45 by aligning the edges of the media 45 with corresponding alignment marks 205. Media 45 having different widths may be accommodated by choosing the pair of alignment marks 205 that are best positioned to match the width of the particular media 45. For example, wider media may be aligned using the outermost alignment marks 205, while media having a narrower width may be aligned with the innermost alignment marks 205.

The alignment marks 205 may be provided on the outside surface of the ribbon cover 20 in several ways. For example, the alignment marks 205 may be printed or etched directly on the ribbon cover 20. Alternatively, the alignment marks 205 may be pre-printed on a label, for example along with a product logo or other design, and the label may then be adhered or otherwise affixed to the ribbon cover 20 in the appropriate location.

Once the edges of the media 45 have been aligned with the appropriate alignment marks 205, the media cover 30 may be closed to hold the media in place. The alignment can then be double checked (for example, to ensure that the media 45 was not shifted as the media cover 30 was closed) by extending the leading end 207 of the media roll 45 across the surface of the closed media cover 30. Alignment ribs 209 are provided on the media cover 30 of FIG. 26 for aligning the edges of the media 45 once the media cover 30 is in the closed media position, i.e., the edges of the media as it exits the media exit slot may be compared against the alignment ribs 209. As with the alignment marks 205, several alignment ribs 209 may be provided to allow for different widths of media 45. If the media 45 is not aligned with the corresponding alignment ribs 209, the media cover 30 may be opened to allow the user to re-adjust the media 45 using the alignment marks 205 as described above. The alignment ribs may be integrally molded with the media cover 30, or they may be manufactured separately and adhered or otherwise affixed to the surface of the media cover 30.

Figure 27:
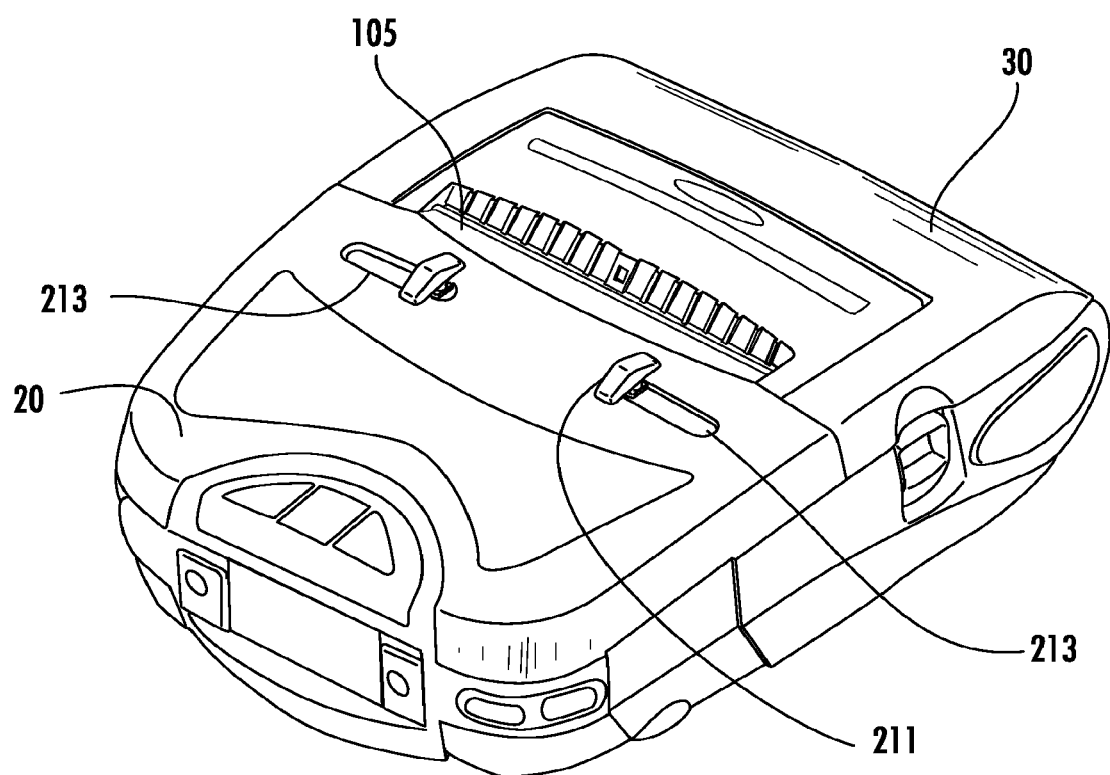
FIG. 27 shows a printer including an alignment feature according to another embodiment.

Referring now to FIG. 27, another form of the media alignment feature may include adjustable edge guides 211 on the ribbon cover 20 that can be used to guide the edges of the media 45 as it exits the media exit slot 105. Each edge guide 211 may be movable within a guide slot 213 to accommodate media 45 of various widths. In this regard, the edge guides 211 may be connected by guide linkage (not shown) within the ribbon cover 20 such that movement of one of the edge guides 211 results in movement of the other edge guide 211 in the opposite direction.

For example, upon extending the leading end 207 of the media 45 across the ribbon cover 20, prior to closing the media cover 30, the user may manually adjust one of the edge guides 211, thereby moving both edge guides 211 to fit the width of the media 45. In other words, if the edge guides 211 are spaced too far apart and do not contact the edges of the media 45, the user may push one of the edge guides 211 towards the edge of the media 45 until the edge guide 211 contacts the media 45. As the edge guide 211 is moved towards the edge of the media 45 on one side, the other edge guide 211 is also moved into contact with the opposite edge of the media 45 via the guide linkage. Conversely, if the edge guides 211 are spaced too close to each other and do not fit the width of the media 45, they may be moved apart in much the same way. By linking the two edge guides 211 in this manner, the media 45 may be generally centered within the media exit slot 105 during the alignment process. Once the media 45 has been aligned, the media cover 30 may be closed, and the alignment of the media 45 may be double-checked using alignment ribs 209 or other alignment features as described above.

Figure 28:
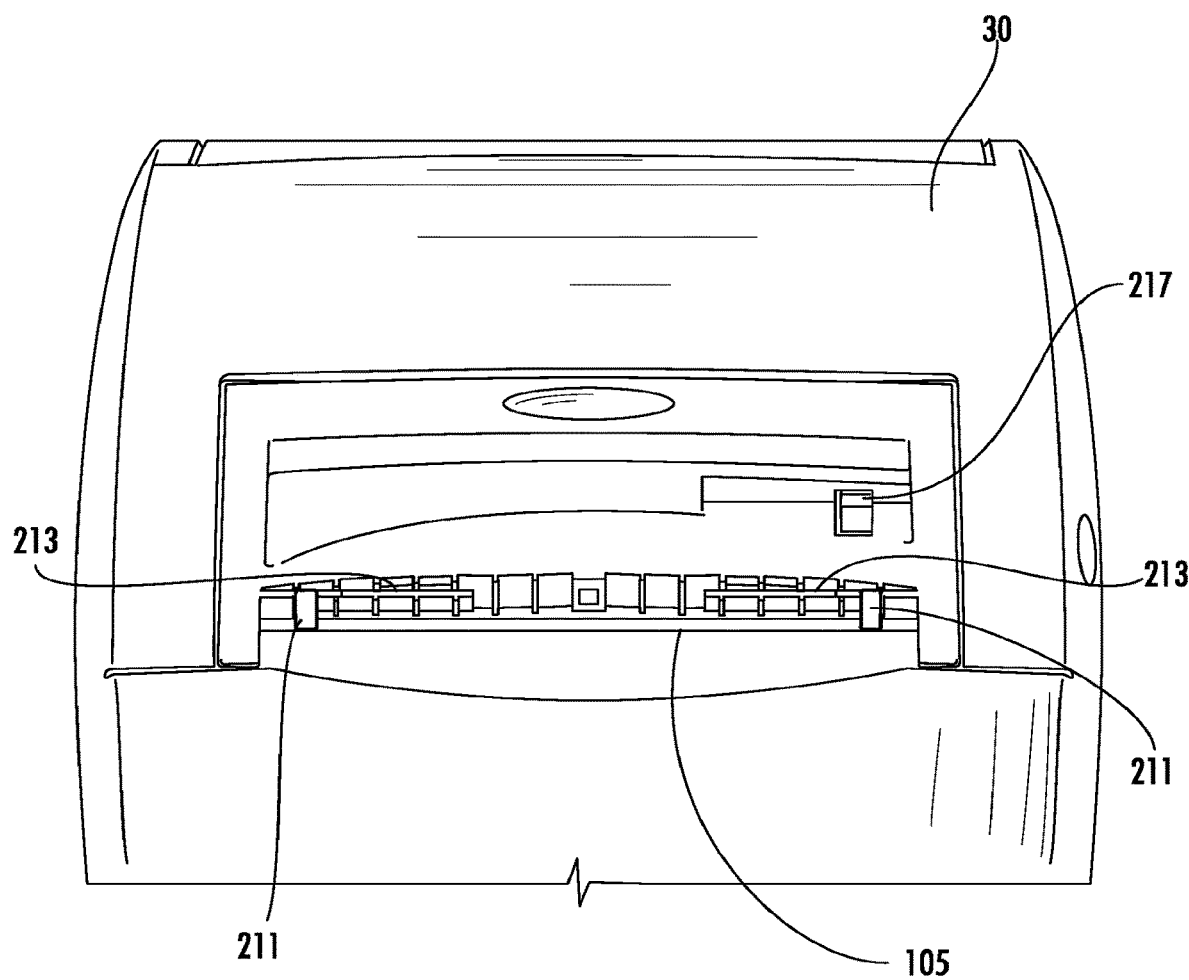
FIG. 28 is a top view of a portion of a printer including an alignment feature according to another embodiment.
Figure 29:
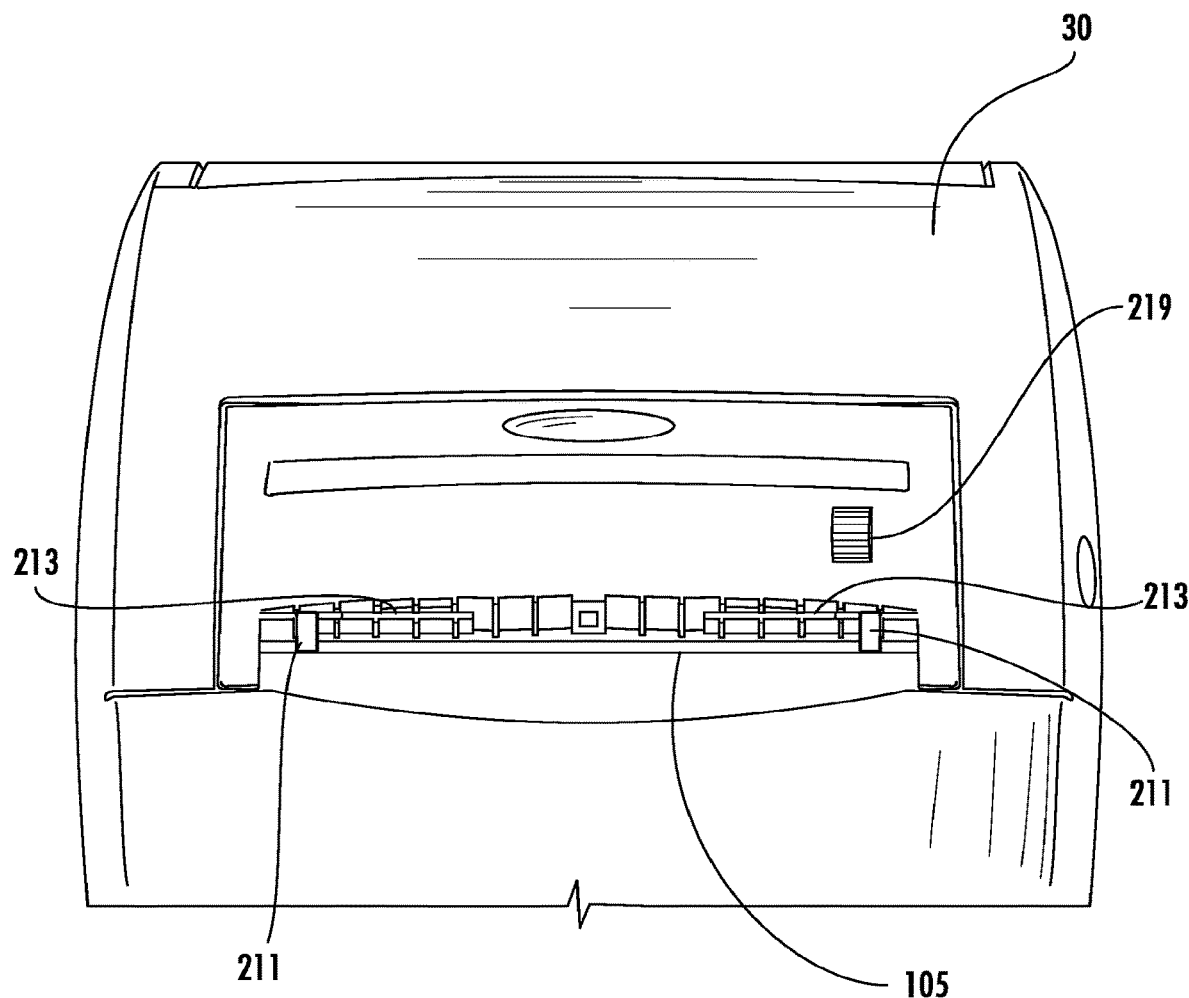
FIG. 29 is a top view of a portion of a printer including an alignment feature according to another embodiment.
Figure 30:
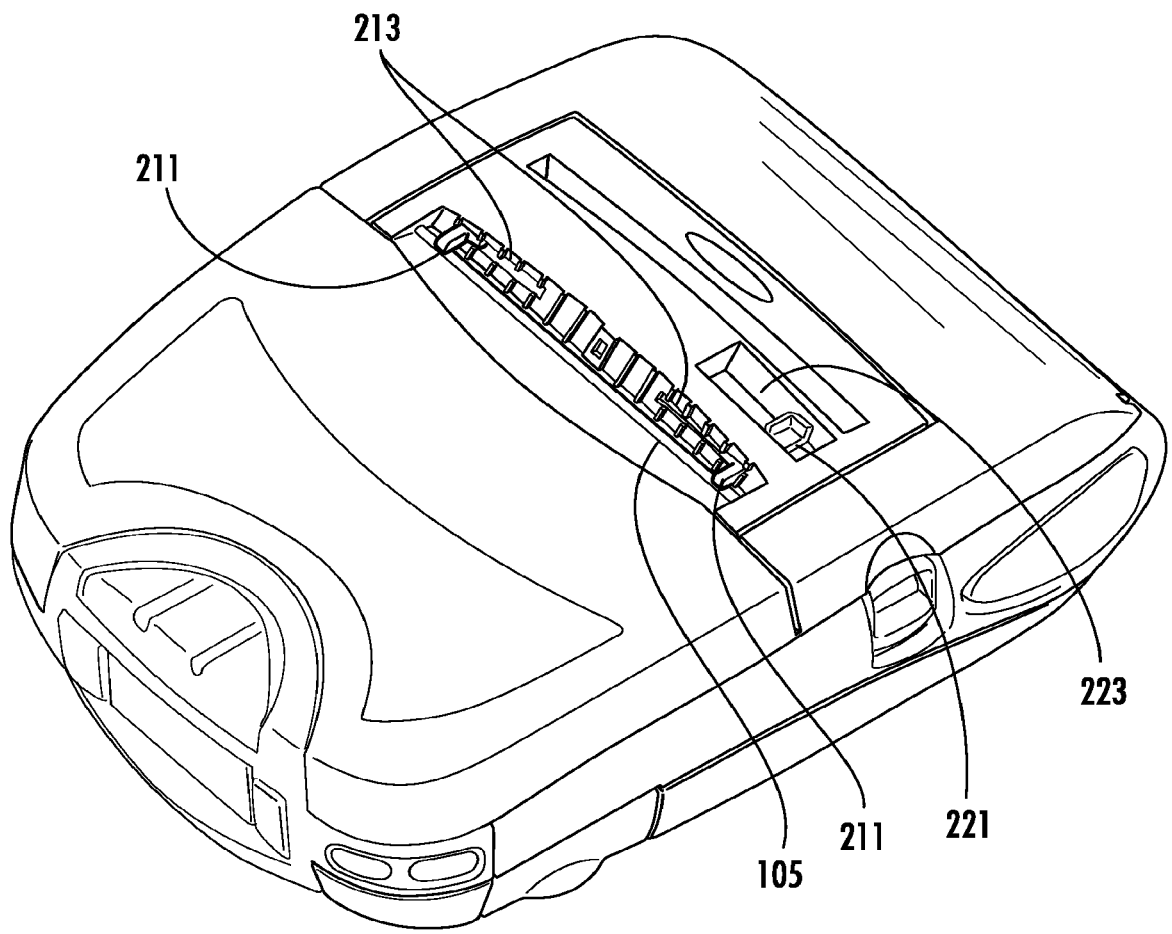
FIG. 30 shows a printer including an alignment feature according to another embodiment.

Instead of moving the edge guides 211 directly (i.e., by pushing or pulling on the edge guide 211 itself), FIG. 28 depicts a form of the media alignment feature that includes edge guides 211 that are movable via a lever 217. Similarly, the edge guides 211 of FIG. 29 are movable via a dial 219, and in FIG. 30 the edge guides 211 are movable via a slider 221 that slides along a slot 223 formed by the media cover 30. In FIGS. 28, 29, and 30, the edge guides 211 are movable within guide slots 213 located on the media cover 30, proximate the media exit slot 105. In this way, the leading end of the media 45 need not be extended across the outside surface of the ribbon cover 20 for purposes of alignment.

Referring to FIG. 28, the user may align the edges of the media 45 with two edge guides 211 by pushing on the lever 217. With reference to FIG. 28, the position of the lever 217 farthest from the media exit slot 105 may correspond to the outermost position of the edge guides 211 (i.e., to accommodate the widest media), as shown. When the user in this example wishes to accommodate smaller media widths, the user may push the lever 217 towards the media exit slot 105, which serves to gradually move the edge guides 211 closer to each other. Other embodiments may provide for the opposite motions of the edge guides 211 with movement of the lever 217. Similarly, in FIG. 29, the user may rotate a dial 219 to move the edge guides 211. For example, rotating the dial 219 towards the media exit slot 105 may move the edge guides 211 closer together, while rotating the dial 219 away from the media exit slot 105 may move the edge guides 211 farther apart, or vice versa. In FIG. 30, the user may move the slider 221 from one end of the slot 223 to the other end to adjust the position of the edge guides 211. Regardless, the coordinated movement of the edge guides 211 allows the user to align the edges of the media 45 with the two edge guides 211 while maintaining a particular position within the media exit slot 105 (for example, while keeping the media centered as it is outputted from the media exit slot 105).

In addition to facilitating the alignment of the media, any of these embodiments may also be used to provide a simple measurement to the user as to the width of the loaded media. This measurement may be used to recalibrate the printer for the supply currently loaded. For instance, if the printer, or the host system, was configured to print 2-inch wide labels, and the printer is now loaded with 4-inch wide labels, the user may wish to simply modify the position of printing on the labels along the new left edge. Determining the measurement and entering it into the printer via the front panel or from a device in communication with the printer would allow the printer to make the necessary calculations for repositioning printed information in the proper location.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for performing load control for a battery, the method comprising:
    transmitting a request for a state of charge value from a processor of a media processing device to the battery;
    receiving, by the processor from the battery, a representation of the state of charge value in response to the request;
    comparing the representation of the state of charge value with a state of charge threshold; and
    in response to the state of charge value being less than the state of charge threshold, transmitting, from the processor, a signal to a charging controller of the media processing device; and
    changing, via the charging controller, a charging state of the battery from an open circuit condition to a closed circuit condition independent of whether a charging power supply is present.

2. The method of claim 1, wherein the state of charge threshold represents a lower threshold for the state of charge value.

3. The method of claim 2, wherein the signal to change the charging state of the battery includes allowing a charging current to the battery when the charging power supply is present.

4. The method of claim 3, wherein the charging state of the battery is maintained until an upper threshold for the state of charge value is satisfied.

5. The method of claim 4, further comprises discharging the battery in response to satisfaction of the upper threshold.

6. The method of claim 1, wherein changing the charging state of the battery comprises providing power for operation of the media processing device.

7. The method of claim 1, wherein the request includes a first formatted message and the representation of the status of charge is received as a second formatted message.

8. The method of claim 1, wherein the representation of the state of charge value is determined relative to a degraded power output of the battery.

9. A media processing device comprising:
    a processor;
    a battery having an operating state;
    a load controller in communication with the processor and the battery; and
    a charging controller in communication with the processor, the charging controller configured to change a charging status of the battery by switching between an open circuit condition and a closed circuit condition,
    the processor configured to:
        transmit a request message to the battery for a state of charge value;
        receive, at the processor, a representation of the state of charge value in a response message from the battery, the representation of the state of charge value is determined relative to a degraded power output of the battery;
        compare, at the processor, the representation of the state of charge value with a state of charge threshold; and
    transmit a signal to the charging controller in response to the state of charge value being less than the state of charge threshold, and
    the charging controller configured to:
        change a charging state of the battery from the open circuit condition to the closed circuit condition independent of whether a charging power supply is present.

10. The media processing device of claim 9, wherein the operating state of the battery comprises charging the battery.

11. The media processing device of claim 9, wherein the operating state of the battery comprises providing power from the battery to the load controller such that the power can be provided to a load within the media processing device.

12. The media processing device of claim 11, wherein the load is a printhead.

13. The media processing device of claim 9, wherein the battery monitors itself to determine the state of charge value and the processor receives the representation of the state of charge value from the battery in response to transmission of the request.

* * * * *